United States Patent
Kim et al.

(10) Patent No.: US 9,900,727 B2
(45) Date of Patent: Feb. 20, 2018

(54) METHOD AND APPARATUS FOR CONTROLLING ACCESS IN WIRELESS COMMUNICATION SYSTEM

(71) Applicant: LG ELECTRONICS INC., Seoul (KR)

(72) Inventors: Seongyun Kim, Seoul (KR); Seungkyu Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 112 days.

(21) Appl. No.: 14/760,105

(22) PCT Filed: Jan. 15, 2014

(86) PCT No.: PCT/KR2014/000425
§ 371 (c)(1),
(2) Date: Jul. 9, 2015

(87) PCT Pub. No.: WO2014/112781
PCT Pub. Date: Jul. 24, 2014

(65) Prior Publication Data
US 2015/0358824 A1 Dec. 10, 2015

Related U.S. Application Data

(60) Provisional application No. 61/753,932, filed on Jan. 18, 2013, provisional application No. 61/786,625, (Continued)

(51) Int. Cl.
*H04L 29/06* (2006.01)
*H04L 12/08* (2006.01)
(Continued)

(52) U.S. Cl.
CPC ............ *H04W 4/005* (2013.01); *H04L 63/101* (2013.01); *H04L 63/20* (2013.01);
(Continued)

(58) Field of Classification Search
CPC ...... H04W 4/005; H04W 12/08; H04W 4/001; H04L 63/101; H04L 63/20; H04L 41/0813
See application file for complete search history.

(56) References Cited

U.S. PATENT DOCUMENTS 6,823,338 B1 11/2004 Byrne et al.
7,082,553 B1 7/2006 Wang
(Continued)

FOREIGN PATENT DOCUMENTS

CN 1553380 A 12/2004
CN 1819526 A 8/2006
(Continued)

OTHER PUBLICATIONS

"Lightweight Machine to Machine Technical Specification," Open Mobile Alliance OMA-TS-LightweightM2M-V1_0-20130409-D, XP064164695, Draft Version 1.0, Apr. 9, 2013, p. 1-62.
(Continued)

*Primary Examiner* — Mohammad A Siddiqi
(74) *Attorney, Agent, or Firm* — Birch, Stewart, Kolasch & Birch, LLP

(57) ABSTRACT

Provided is a method for processing a specific object instance associated with a server due to a server account deletion in a wireless communication system, according to one embodiment of the present invention, wherein the method is performed by a terminal and comprises the steps of: receiving from a first server an action command for deleting an account of a specific server; deleting the specific object instance and an access control object instance associated with same when the specific object instance is an object instance accessible only to the specific server, and deleting access authorization information of the specific server from the access control object instance associated with the specific object instance when the specific object
(Continued)

instance is an object instance accessible by a plurality of servers including the specific server; and changing the server having the largest sum of values granted to an access authorization of each of the plurality of servers, with the exception of the specific server as the access control owner, when the specific server is the only access control owner of the access control object instance.

10 Claims, 8 Drawing Sheets

Related U.S. Application Data filed on Mar. 15, 2013, provisional application No. 61/818,918, filed on May 3, 2013, provisional application No. 61/823,411, filed on May 15, 2013, provisional application No. 61/827,730, filed on May 27, 2013.

(51) Int. Cl.
  *H04W 4/00* (2009.01)
  *H04W 12/08* (2009.01)
  *H04L 12/24* (2006.01)

(52) U.S. Cl.
  CPC ......... *H04L 41/0813* (2013.01); *H04W 4/001* (2013.01); *H04W 12/08* (2013.01)

(56) References Cited

U.S. PATENT DOCUMENTS

| | | | |
|---|---|---|---|
| 2006/0184530 A1 | 8/2006 | Song et al. | |
| 2010/0106967 A1* | 4/2010 | Johansson | H04L 9/12 713/158 |
| 2011/0016321 A1* | 1/2011 | Sundaram | H04L 63/061 713/171 |
| 2011/0026501 A1 | 2/2011 | Sharaga et al. | |
| 2011/0125807 A1 | 5/2011 | Bland | |
| 2011/0196966 A1 | 8/2011 | Chai et al. | |
| 2012/0066367 A1* | 3/2012 | Chai | H04L 12/24 709/223 |
| 2012/0304313 A1 | 11/2012 | Mao et al. | |
| 2014/0012939 A1 | 1/2014 | Park et al. | |
| 2014/0082195 A1* | 3/2014 | Basso | H04L 63/101 709/225 |
| 2015/0038115 A1* | 2/2015 | Kim | H04L 63/101 455/411 |
| 2015/0055640 A1* | 2/2015 | Wang | H04W 4/005 370/338 |
| 2015/0127831 A1* | 5/2015 | Kim | H04L 67/125 709/225 |
| 2015/0296470 A1* | 10/2015 | Kim | H04L 41/082 455/435.2 |
| 2015/0305008 A1* | 10/2015 | Kim | H04W 72/0406 370/329 |

FOREIGN PATENT DOCUMENTS

| | | |
|---|---|---|
| CN | 101080077 A | 11/2007 |
| CN | 101282330 A | 10/2008 |
| CN | 101316273 A | 12/2008 |
| JP | 2006-270353 A | 10/2006 |
| JP | 2007-193829 A | 8/2007 |
| JP | 2012-505484 A | 3/2012 |
| JP | 2013-500683 A | 1/2013 |
| KR | 10-2011-0031234 A | 3/2011 |
| WO | WO 2010/043175 A1 | 4/2010 |
| WO | WO 2012/124999 A2 | 9/2012 |

OTHER PUBLICATIONS

"OMA Device Management Tree and Description," Open Mobile Alliance OMA-TS-DM_TND-V1_3-20121213-C, XP064162876, Candidate Version 1.3, Dec. 13, 2012, pp. 1-62.

Kim et al., "Server Object Instance Deletion," Open Mobile Alliance OMA-DM-LightweightM2M-2013-0029-CR, XP064164341, Mar. 18, 2013, pp. 1-4.

* cited by examiner

FIG. 3
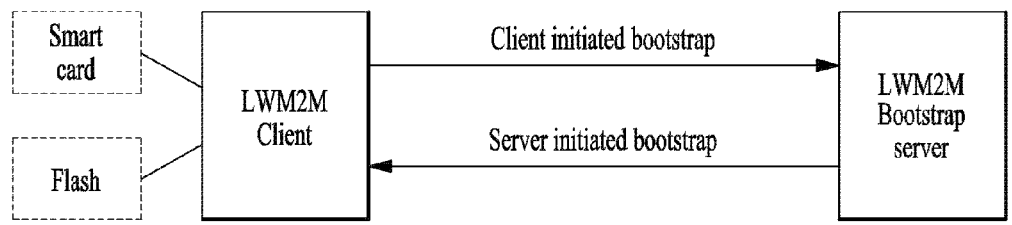
(a)
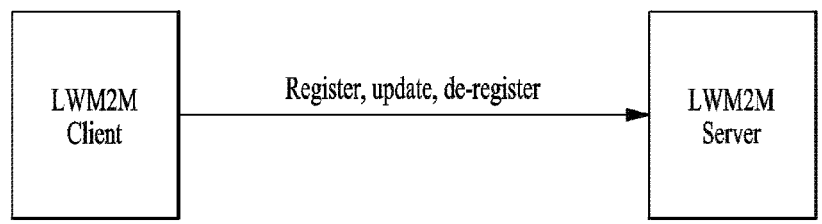
(b)
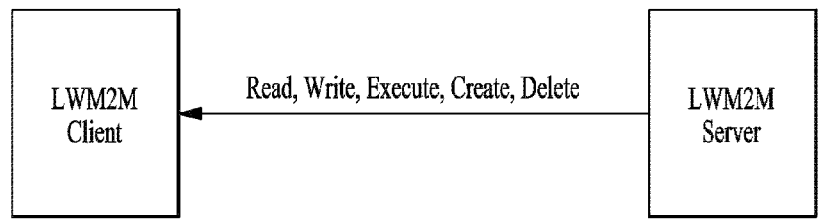
(c)
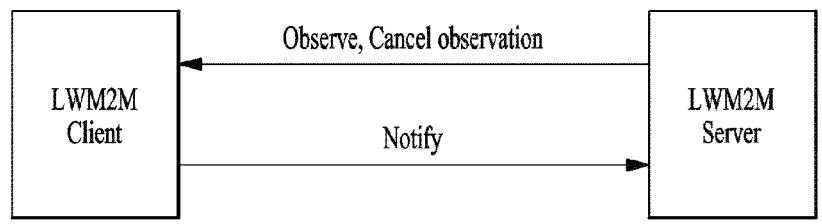
(d)

METHOD AND APPARATUS FOR CONTROLLING ACCESS IN WIRELESS COMMUNICATION SYSTEM

CROSS REFERENCE TO RELATED APPLICATIONS

This application is the National Phase of PCT International Application No. PCT/KR2014/000425, filed on Jan. 15, 2014, which claims priority under 35 U.S.C. 119(e) to U.S. Provisional Application Nos. 61/753,932, 61/786,625, 61/818,918, 61/823,411, and 61/827,730, filed on Jan. 18, 2013, Mar. 15, 2013, May 3, 2013, May 15, 2013, and May 27, 2013 respectively, all of which are hereby expressly incorporated by reference into the present application.

TECHNICAL FIELD

The present invention relates to a method for controlling access in a wireless communication system and an apparatus for the same.

BACKGROUND ART

M2M (Machine to Machine) communication technology has come into the spotlight with the advent of ubiquitous era. M2M can be used for various applications such as e-health, smart grid, smart home, etc. In such applications, M2M devices having various hardware specifications are used and thus a protocol which can accept any type of M2M device is needed. Accordingly, it is necessary to develop an application layer protocol suitable for resource-constrained M2M devices. Such protocol is applicable to resource-constrained M2M devices and thus can also be applied to M2M devices having different specifications.

In the meantime, M2M devices require access control technology. Particularly, when an M2M server account registered with an M2M client is deleted, it is necessary to process M2M server account deletion and resources associated with an M2M server to be deleted. According to M2M server account deletion, a specific resource may be a resource for which access rights are not present or an M2M server that manages access rights for resources in an M2M client may be removed. Accordingly, a solution thereto is needed.

DISCLOSURE

Technical Problem

The present invention provides a method for access control.

More specifically, an object of the present invention is to provide a method for processing resources associated with a specific server account when the specific server account is deleted.

Another object of the present invention is to provide a method for authenticating notification.

Another object of the present invention is to provide a method for setting an access mode of a terminal.

The technical problems solved by the present invention are not limited to the above technical problems and those skilled in the art may understand other technical problems from the following description.

Technical Solution

According to one aspect of the present invention, a method for processing, by a terminal, a specific object instance associated with a server due to deletion of an account of the server in a wireless communication system includes: receiving, from a first server, an operation command for deleting an account of a specific server; deleting the specific object instance and an access control object instance associated with the specific object instance when the specific object instance is an object instance accessible by the specific server only; deleting access right information of the specific server from the access control object instance associated with the specific object instance when the specific object instance is an object instance accessible by a plurality of servers including the specific server; and changing a server having the highest sum of values assigned to each access right, from among the plurality of servers except for the specific server, to an access control owner of the access control object instance, when the specific server is a unique access control owner of the access control object instance.

Additionally or alternatively, the changing may include selecting one of two or more servers when there are the two or more servers having the highest sum of values, and changing the selected server to the access control owner.

Additionally or alternatively, the operation command for deleting the account of the specific server may be received through a bootstrap interface.

Additionally or alternatively, the first server may be a bootstrap server.

Additionally or alternatively, the method may further include transmitting, to a second server, notification for change of the access control owner when the access control owner is changed, if an "observe" operation is set for the access control owner of the access control object instance by the second server.

Additionally or alternatively, the method may further include deleting configuration information related to an "observe" operation command stored through the "observe" operation command transmitted from the specific server.

Additionally or alternatively, the account of the specific server may include a short server ID of the specific server and a security key for communication with the specific server.

According to another aspect of the present invention, a terminal configured to process a specific object instance associated with a server due to deletion of an account of the server in a wireless communication system includes: a radio frequency (RF) unit; and a processor configured to control the RF unit, wherein the processor is configured to receive, from a first server, an operation command for deleting an account of a specific server, to delete the specific object instance and an access control object instance associated with the specific object instance when the specific object instance is an object instance accessible by the specific server only, to delete access right information of the specific server from the access control object instance associated with the specific object instance when the specific object instance is an object instance accessible by a plurality of servers including the specific server and to change a server having the highest sum of values assigned to each access right, from among the plurality of servers except for the specific server, to an access control owner of the access control instance, when the specific server is a unique access control owner of the access control object instance.

Additionally or alternatively, the processor may be configured to select one of two or more servers when there are the two or more servers having the highest sum of values and to change the selected server to the access control owner.

Additionally or alternatively, the operation command for deleting the account of the specific server may be received through a bootstrap interface.

Additionally or alternatively, the first server may be a bootstrap server.

Additionally or alternatively, if an "observe" operation is set for the access control owner of the access control object instance by a second server, the processor may be configured to transmit, to the second server, notification for change of the access control owner when the access control owner is changed.

Additionally or alternatively, the processor may be configured to delete an configuration information related to "observe" operation command stored through the "observe" operation command transmitted from the specific server.

Additionally or alternatively, the account of the specific server may include a short server ID of the specific server and a security key for communication with the specific server.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to promote efficient resource management.

According to an embodiment of the present invention, it is possible to enable efficient notification in response to observation.

According to an embodiment of the present invention, it is possible to efficiently manage power of a terminal.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 3 illustrates interface models according to an embodiment of the present invention;

BEST MODE

Figure 1:
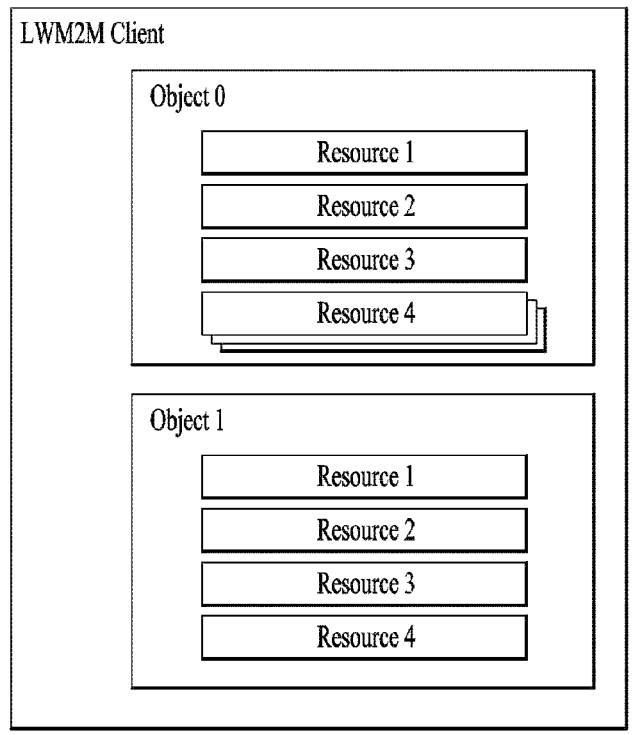
FIG. 1 illustrates a structure of data stored in an M2M client.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a device for M2M communication, that is, an M2M client or terminal may be fixed or mobile and includes a server for M2M communication, that is, an M2M server or a device which communicates with the server to transmit/receive user data and/or control information. The M2M client may be referred to as terminal equipment, MS (Mobile Station), MT (Mobile Terminal), UT (User Terminal), SS (Subscribe Station), wireless device, PDA (Personal Digital Assistant), wireless modem, handheld device, etc. In addition, the M2M server refers to a fixed station communicating with M2M terminals and/or other M2M servers and exchanges data and control information with M2M terminals and/or other M2M servers by communicating therewith.

A description will be given of the related art.

Device Management

Device management refers to management of device configuration and other managed objects of devices from the point of view of various management authorities. Device management includes, but is not restricted to setting initial configuration information in devices, subsequent updates of persistent information in devices, retrieval of management information from devices and processing events and alarms generated by devices.

Management Tree

Management tree refers to an interface by which a management server interacts with a client, e.g. by storing values in the management tree or retrieving values from the management tree and by manipulating the properties of the management tree, for example, access control lists. In the specification, the term management tree can be used interchangeably with the term device management tree or DM tree.

Management Object (MO)

A management object is a subtree of the management tree which is intended to be a (possibly singleton) collection of nodes which are related in some way. For example, ./DevInfo Nodes form a management object. A simple management object may consist of one single node.)

Device Management (DM) Server

A DM server may be an abstract software component in a deployed device management infrastructure that conforms to OMA device management enabler static conformance requirements specified for DM servers. The DM server serves as an end-point of DM client-server protocols and a DM server-server interface.

In the specification, the DM server may be mounted in a device, computer, etc. including a communication module, a processor module, etc.

Device Management (DM) Client

A DM client may be an abstract software component in a device implementation that conforms to OMA device management Enabler static conformance requirements specified for DM clients. The DM client serves as an end-point of the DM client-server protocols.

In the specification, the DM client may be mounted in a device including a communication module, a processor module, etc., which is an object of DM. The DM client may be implemented as a single device.

Access Control List (ACL)

An ACL refers to a list of DM server identifiers regarding a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node is a node that may have child nodes, but cannot store any value allocated to a node, that is, a node value. The format property of an interior node is "node".

Leaf Node

A leaf node can store a node value, but cannot have child nodes. The format property of a leaf node is not "node".

Accordingly, all parent nodes must be interior nodes.

Permanent Node

A permanent node is permanent if the DDF property scope is set to permanent. If a node is not permanent, the node corresponds to a dynamic node. The permanent node cannot be dynamically generated or deleted by a server.

Dynamic Node

A dynamic Node is dynamic if the DDF property scope is set to dynamic or if the scope property is unspecified.

Sever Identifier

A server identifier refers to an OMA DM internal name for a DM server. A DM Server is associated with an existing server identifier in a device through OMA DM account.

ACL Properties and ACL Values

All terminals managed by a DM protocol have a single DM tree starting with a root node and the DM protocol performs management of terminals by manipulating each node of the DM tree. For example, to install downloaded software in a terminal, the software can be installed by executing a node "install" matched to the software. Each node may indicate simple information such as a numeral and complicated data such as graphical data or log data. In addition, a node may indicate a command such as "Execute", "Download" or the like.

Each node has properties of providing meta data related thereto. The properties include runtime which refers to duration of a node from generation of the node in the DM tree to extinction of the node. The runtime property includes an ACL, format, name, size, title, Tstamp, type and VerNo.

The ACL is mandatory such that both a terminal and a server need to implement the ACL in DM 1.3 protocol. The ACL specifies DM commands that a specific DM server can execute on a specific node. An unspecified command cannot be executed. In other words, the ACL refers to rights granted to a specific DM server for a specific node. In the DM protocol, the ACL is given to the server identifier of a DM server and is not assigned to a URI, an IP address and a DM server certificate. The server identifier is used as an identifier for authenticating the DM server in the DM protocol. Furthermore, the ACL can be provided as ACL property and an ACL value provided to the ACL property. In the specification, an ACL value may also be referred to as ACL information or information about the ACL. In DM 1.3 protocol, all nodes are defined to have the ACL property. All nodes having the ACL property are defined to have an empty ACL value or a non-empty ACL value.

The ACL has unique properties different from the runtime property. The unique properties include ACL inheritance. ACL inheritance refers to the concept of obtaining an ACL value for a node, which is included in a DM tree and does not have an ACL value, from the ACL value of the parent node of the node. If the parent node also does not have the ACL value, then the ACL value of the parent node is obtained from the ACL value of the parent node of the parent node. Since the root node corresponding to the highest node of the DM tree must have an ACL value in the DM protocol, the ACL value must be inherited. ACL inheritance is performed for all ACL values rather than being performed per DM command. Accordingly, ACL inheritance from the parent node of the node is carried out only when a node has an empty ACL value. That is, if an ACL value of a node specifies only "Add", unspecified "Get" is not inherited.

In the DM protocol, the root node has "Add=*&Get=*" as a basic value for ACL. Here, "*" denotes a wild card and means an arbitrary DM server. To get an ACL value, the DM server uses the "Get" command. The "Get" command regarding ./NodeA/Node1 gets an ACL value of ./NodeA/Node1. To change an ACL value, a "Replace" command is used. When "Replace" is executed on ./NodeA/Node1?prop=ACL" to set "Add=DMS1&Delete=DMS1&Get=DMS1", the ACL value is changed. In the DM protocol, an individual ACL entry cannot be changed and all ACL values can be changed. The right to get and change an ACL value is defined based on ACL. The right for an interior node and the right for a leaf node are differently defined.

Interior node: If the corresponding node has "Get" and "Replace" rights, it is possible to get and replace the ACL value of the corresponding node. "Replace" refers to the right to replace ACL values of all child nodes.

Leaf node: If a parent node of the corresponding node has "Replace" rights, the ACL value of the corresponding node can be replaced. The parent node needs to have "Get" rights in order to get the ACL of the corresponding node. Similarly, if the corresponding node has "Replace" rights, the ACL value of the node can be replaced. To replace the ACL value, the parent node of the corresponding node needs to have "Replace" rights.

The right to replace the ACL value of the corresponding node can be controlled by the ACL value of the parent node of the node irrespective of whether the node is an interior node or a leaf node. If an interior node has "Replace" rights, ACL values of all child nodes as well as the ACL value of the interior node can be replaced. Accordingly, if the root node has "Replace" rights, it is possible to have any right for all nodes in the DM tree. However, even when a parent node has "Replace" rights, specific rights such as "Get" and "Get" are not provided for a child node and right such as "Get" needs to be directly specified for the child node. Accordingly, the ACL value of the child node needs to be corrected prior to execution of a command and the ACL value of the child node is corrected by correcting ACL values of all nodes located before the corresponding child node. This is inconvenient and thus the DM protocol allows the ACL value of a corresponding node to be directly corrected without change of ACL values of intermediate nodes when the parent or ancestor node has "Replace" rights.

When a DM server generates a new node through command "Add", the generated node does not have an ACL value in general and thus gets the ACL value from the parent node thereof. However, when the generated node is an interior node and the parent node thereof does not have "Replace" rights, it is necessary to set the ACL value of the generated node at the same time when the node is generated to provide the right to manage the node.

The syntax for representing ACL values is defined in [DM-TND]. An exemplary ACL value is "Get=DMS1&Replace=DMS1&Delete=DMS2". Here, DMS1 and DMS2 are DM server identifiers and "Get", "Replace" and "Delete" are DM commands. Accordingly, DM server DMS1 can execute "Get" and "Replace" on a corresponding node and DM server DMS2 can execute "Delete" on the corresponding node. Here, Get=DMS1, Replace=DMS1 and Delete=DMS2 are ACL-entries and represent individual command rights of the DM servers. In other words, an ACL value is a set of individual ACL-entries and an ACL value of each node can include at least one ACL-entry.

DDF (Device Description Framework)

DDF is a specification for how to describe the management syntax and semantics for a particular device type. DDF provides information about MO, management functions and DM tree structure of terminals.

DM 1.3 Authentication

DM 1.3 performs authentication based on ACL. DM authentication is performed per DM command. If a DM server has transmitted a plurality of DM commands, a DM client (referred to as a DMC hereinafter) performs authentication prior to execution of the commands and executes only a DM command granted as a result of authentication.

DM Tree

A DM tree refers to a set of MO instances exposed by a DMC. The DM tree functions as an interface by a management server interacting with a client. For example, the management server can store and retrieve specific values from the DM tree and manipulate properties of the DM tree.

In a multi-server environment, a plurality of servers may be connected to one terminal to manage the terminal or to use services provided by the terminal. The terminal may provide the services in the form of resources or resource groups. That is, the terminal can provide a specific service to a server in such a manner that the terminal exposes a specific resource (group) to the server such that the server can execute the specific server by operating the resource.

A server corresponding to an access right manager that manages access right for a resource (group) is present. When the access right manager for the resource is unique and other servers capable of accessing the resource are present, a server account of the corresponding resource manager may be deleted. In this case, since the account of the access right manager for the resource has been deleted, no server can perform access right management for the corresponding resource and thus no server can set which server can access the resource (have the right for a specific command for the corresponding command, for example) and/or cancel the setting. Accordingly, the present invention provides a method for setting an access right manager server on the basis of access rights of other servers from among other servers capable of accessing the corresponding resource for the purpose of continuous access right management for the resource even when the server account of the access right manager is deleted.

FIG. 1 illustrates a data structure stored in an M2M client. The M2M client (or terminal) may have entities corresponding to groups of resources referred to as "objects" corresponding to functions that can be implemented by the M2M client. An object identifier may be defined in object specification and an identifier that is not defined in the object specification may be set by an operator or manufacturer using the M2M system. A resource is an entity that stores data and may have a plurality of resource instances. Each object is generated and instantiated as an object instance by a specific operation and the M2M client can access the corresponding resource through the object instance.

The "object" is a definition for a group of resources to be used for a specific function (functionality) or purpose, and the "object instance" is an instantiated (created) resource group for the object in a terminal. To use the function of the object, the object instance must be generated.

Specifically, the "object", which conceptually corresponds to a template or blueprint of a resource group to be instantiated, defines resources that the resource group to be instantiated can have, properties (e.g., an identifier, name, supported operation command, range, unit and specification of the resource) that the resources have, and an operation performed according to a specific operation command. The "object instance" is a resource group instantiated or present in the terminal according to the definition of the object. A resource of the resource group may have a corresponding value.

In the descriptions given below, "object" may be interchangeably with "group of supported resource(s)" or "resource group definition", and "object instance" may be used interchangeably with "group of instantiated resource(s)" or "resource group".

In addition, information indicating an operation supported by a resource is included in or added to the resource. There are operations "Read", "Write", "Execute", "Write Attribute", "Discover", "Observe", etc.

Figure 2:
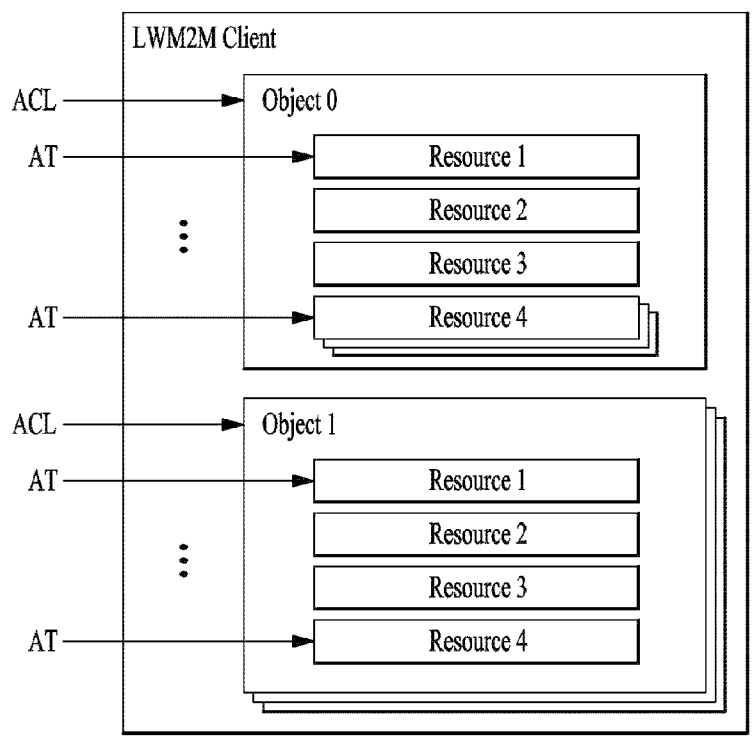
FIG. 2 illustrates a resource model according to an embodiment of the present invention.
Figure 4:
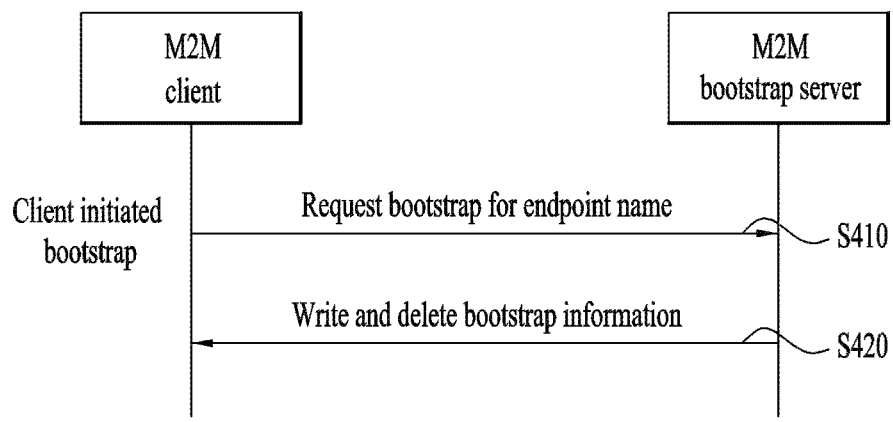
FIG. 4 illustrates a bootstrap operation according to an embodiment of the present invention.

FIG. 2 illustrates a resource model according to an embodiment of the present invention. An ACL (Access Control List) and an AT (Access Type) are assigned for control of access rights for resources to be used in the M2M system according to an embodiment of the present invention.

The ACL is assigned per resource corresponding to a specific function, that is, per object instance. Lower resources of each object instance are considered to be allocated the same ACL. That is, since the ACL is assigned per object instance, lower resources of each object instance have the same ACL.

Since an object instance is an entity corresponding to a resource group and is a group for executing a specific function, the same right should be granted for all resources in a group when the right for a specific function is granted for a specific server. When the same right is not granted, operation can be partially performed for a function. In this case, the function of the server becomes ambiguous and the meaning of granting authority is unclear. Accordingly, in an embodiment of the present invention, an ACL is assigned per object instance, as described above, to reduce overhead, compared to storage per resource, and to simplify an access right authentication procedure by using the same mechanism to find an ACL.

For reference, each object may be instantiated as a plurality of object instances.

The AT can be assigned per resource and define an access scheme supported by each resource. For example, when an access scheme is defined as operations, the AT can be defined as specific operations, for example, "Read", "Write" and "Execute".

The ACL and AT may be referred to by different terms. For example, the ACL can be referred to as access right and the AT can be referred to as a supportable operation.

Interface

A description will be given of an interface through which specific operations are transmitted between a server and a client (terminal) prior to description of embodiments of the present invention.

Four interfaces related to the present invention are present: 1) bootstrap, 2) device (client) registration, 3) device management and service enablement and 4) information reporting. Operations for the four interfaces can be classified into uplink operations and downlink operations. Operations of the interfaces are shown in the following table.

TABLE 1

| Interface | Direction | Logical Operation |
| --- | --- | --- |
| Bootstrap | Uplink | Request Bootstrap |
| Bootstrap | Downlink | Write, Delete |
| Device(Client) Registration | Uplink | Register, Update, De-register |
| Device Management and Service Enablement | Downlink | Read, Create, Delete, Write, Execute, Write Attribute, Discover |
| Information Reporting | Downlink | Observe, Cancel Observation |
| Information Reporting | Uplink | Notify |

FIG. 3 illustrates the four interfaces. FIG. 3(a) illustrates an operation model for the bootstrap interface. For the bootstrap interface, operations include an uplink operation (i.e. client initiated bootstrap) called "Request bootstrap" and downlink operations (i.e. server initiated bootstrap) called "Write" and "Delete". These operations are used to initiate objects necessary for a client to register with one or more servers. Bootstrap is defined using a factory bootstrap (stored in a flash memory, for example) or a bootstrap (stored in a smart card) from the smart card.

FIG. 3(b) illustrates an operation model for "device (client) registration" interface. For the device registration interface, uplink operations called "Register", "Update" and "De-register" are present. "Register" is used to register information of a client in a server and "Update" is used to update the information or state of the client, registered in the server, periodically or according to an event generated in the client. "De-register" is operation of cancelling registration of the client with the server and the server can delete the information of the client according to "De-register".

FIG. 3(c) illustrates an operation model for the "device management and service enablement" interface. For the "device management and service enablement" interface, downlink operations called "Read", "Create", "Write", "Execute", "Write Attribute" and "Discover" are present. These operations are used for interaction with resources, resource instances, objects and object instances of the client. "Read" operation is used to read the current values of one or more resources, "Write" operation is used to update values of one or more resources and "Execute" operation is used to initiate operation defined by a resource. "Create" and "Delete" operations are used to create and delete object instances. "Write Attribute" is used to set an attribute related to "Observe" operation and "Discover" is used to discover the corresponding attribute.

FIG. 3(d) illustrates an operation model for the "information reporting" interface. For the information reporting interface, downlink operations called "Observe" and "Cancel observation" and an uplink operation called "Notify" are present. The information reporting interface is used to transmit a new value related to a resource on the client to the server. "Observe" is used for the server to observe a specific resource when the server is interested in resource change and "Cancel observation" is used when the corresponding observation is no longer performed (when the server no longer wishes to know about resource change). "Notify" is used to notify the server of observation condition attributes set through "Write Attribute" when the observation condition attributes are satisfied.

Data Model for Access Control

To reduce parsing process overhead and space overhead of an M2M device, server identifiers (IDs), ACL (or access right) and AT (or supportable operation) suitable for M2M environments are modeled.

Short Server ID

Information that needs to be included in an ACL must include information on a server and operations that the server can instruct. Server ID may be considerably long since the server ID is represented by a URI in general. Since an ACL needs to be represented per object instance and a long server ID is repeatedly used for object instances, the server ID may cause considerable space overhead depending on the number of object instances. Accordingly, the present invention proposes use of a short server ID having a fixed length (e.g. 2 bytes) for an ACL. The M2M client stores mapping relationship between short server IDs and server IDs and can find a short server ID corresponding to a server ID for an operation received from the server corresponding to the server ID and perform authentication through the corresponding ACL using the short server ID.

TABLE 2

| Identifier | Semantics | Description |
| --- | --- | --- |
| Short Server ID | 16-bit unsigned integer | Short integer ID allocated by a bootstrap server. This identifier uniquely identifies each M2M server configured for the M2M client. |

Access Control List (ACL) or Access Right

An ACL is allocated per object instance and corresponds to a list of ACL entries that designate access right for M2M servers. An ACL entry can be represented by a short server ID and access right of the corresponding server. A short server ID and an access right value are set to fixed short lengths to improve space overhead and processing efficiency during an authentication procedure. With regard to access right, a single bit value is allocated per M2M operation such that a specific operation is authenticated by reading only a single bit value to thereby improve processing efficiency. Default ACL entries for servers other than servers on the ACL can be set, and the M2M client can find a specific short server ID (e.g. 0x0000) when receiving operations with respect to all servers which are not on the ACL and authenticate the operations using the corresponding access right.

TABLE 3

| Field | Description |
|---|---|
| ACL | List of ACL entries |
| ACL entry | Composed of a short server ID and access right |
| | Access right is composed of |
| | $1^{st}$ lsb (least significant bit): Read |
| | $2^{nd}$ lsb: Write |
| | $3^{rd}$ lsb: Execute |
| | Other bits are reserved for future use. |

The ACL entry shown in Table 3 is exemplary and can be set to different values.

Access Type (AT) or Supportable Operations

AT can designate operations supported by resources. One bit is mapped to one operation in the same manner as access right of ACL entry.

TABLE 4

| Field | Description |
|---|---|
| Access Type | $1^{st}$ lsb: Read |
| | $2^{nd}$ lsb: Write |
| | $3^{rd}$ lsb: Execute |
| | Other bits are reserved for future use |

Access type shown Table 4 is exemplary and can be set to different values.

A brief description will be given of operations and objects (instances) described in the aforementioned embodiments and used in the specification.

1. Operation for "Device (Client) Registration" Interface

Register

Registration is performed when an M2M client transmits an operation command "Register" to an M2M server. When the M2M device is turned on and the bootstrap procedure is completed, the M2M client should execute the operation command "Register" for each M2M server (i.e., each server with which the M2M client registers) corresponding to a server object instance of the M2M client. The following table describes parameters used for the operation command "Register".

TABLE 5

| Parameter | Required | Default Value | Notes |
|---|---|---|---|
| Endpoint Client Name | Yes | | Identifies the LWM2M Client on one LWM2M Server (including LWM2M Bootstrap Server). Provided to the LWM2M Server during Registration, also provided to LWM2M Bootstrap Server when executing the Bootstrap procedure. Endpoint Client Name. |
| Lifetime | No | 86400 | If Lifetime Resource does not exist in a LWM2M Server Object Instance, the Client MUST NOT send this parameter and the Server MUST regard lifetime of the Client as 86400 seconds. The registration SHOULD be removed by the Server if a new registration or update is not received within this lifetime. |
| LWM2M Version | No | 1.0 | Indicates the version of the LWM2M Enabler that the LWM2M Client supports. This parameter is required only for LWM2M versions >1.0. |
| Binding Mode | No | U | Indicates current binding and Queue mode of the LWM2M Client. "U" means UDP binding, and "S" means SMS binding. The "Q" can be appended to represent the binding works in the Queue mode. For example, "UQS" means the Client uses both the UDP binding with Queue Mode enabled and the SMS binding with Queue Mode disabled. |
| SMS Number | No | | The value of this parameter is the MSISDN where the LWM2M Client can be reached for use with the SMS binding. |
| Objects and Object Instances | Yes | | The list of Objects supported and Object Instances available on the LWM2M Client. |

Update

Initiated periodically, or based on specific events in the M2M client, or by the M2M server, the M2M client may transmit the operation command "Update" to the M2M server, thereby updating the registered information therein and the registered information in the M2M server. The operation command "Update" should contain only changed parameters listed in the following table with respect to the last registered parameters transmitted to the M2M server.

If the M2M client uses UDP binding for communication with the M2M server and changes in the IP address or port of the M2M client, the M2M client must transmit the operation command "Update" to the M2M server.

TABLE 6

| Parameter | Required |
|---|---|
| Lifetime | No |
| Binding Mode | No |
| SMS Number | No |
| Objects and Object Instances | No |

The operation command "Update" may be initiated by the M2M server via the operation command "Execute" for the "Registration Update Trigger" resource of the M2M server object.

De-Register

When it is determined that the M2M client is not available to the M2M server anymore (e.g., M2M device operation reset), the M2M client must transmit the operation command "De-register" to the M2M server. Upon receiving this operation command, the M2M server should remove the registration information about the M2M client therefrom.

2. Operation for "Device Management and Service Enablement" Interface

Read

"Read" operation is used to access (read) values of individual resources, resource instances of an array, object instances or all object instances of an object and has the following parameters.

TABLE 7

| Parameter | Required | Default Value | Notes |
|---|---|---|---|
| Object ID | Yes | — | Indicates the object. |
| Object Instance ID | No | — | Indicates the object instance to read. If no object instance ID is indicated, then the object instances of objects, which the server is authorized to, are returned. |
| Resource ID | No | — | Indicates the resource to read. If no resource ID is indicated, then the whole object instance is returned. |

Discover

"Discover" operation is used to discover individual resources, object instances and attributes (parameters) set for an object. "Discover" operation can be used to discover resources implemented in an object. Returned values correspond to a list of application/link-format CoRE Links (conform to application/link-format CoRE Links format of RFC6690) for each resource including attributes of the resource. "Discover" operation has the following parameters.

TABLE 8

| Parameter | Required | Default Value | Notes |
|---|---|---|---|
| Object ID | Yes | — | Indicates the object. |
| Object Instance ID | No | — | Indicates the object instance. |
| Resource ID | No | — | Indicates the resource. |

As specific functions of "Discover" operation, information on which resource is implemented and observe parameters configured to objection is returned when only the object ID from among the aforementioned parameters is specified, observe parameters set for a specified object instance can be returned when the object ID and the object instance ID from among the parameters are specified, and observe parameters set for a specific resource can be returned when the object ID, object instance ID and resource ID from among the parameters are specified.

Write

"Write" operation is used to change (write) a plurality of resource values in a resource, resource instances of an array or an object instance. "Write" operation permits a plurality of resources in the same object instance to be changed according to one command. That is, "Write" operation can access object instances (as well as individual resources). "Write" operation has the following parameters.

TABLE 9

| Parameter | Required | Default Value | Notes |
|---|---|---|---|
| Object ID | Yes | — | Indicates the object. |
| Object Instance ID | Yes | — | Indicates the object instance to write. |
| Resource ID | No | — | Indicates the resource to write. The payload is the new value for the resource. If no resource ID is indicated, then the included payload is an object instance containing the resource values. |
| New Value | Yes | — | The new value included in the payload to update the object instance or resource. |

Write Attributes

"Write attributes" operation is used to change (write) attributes of a resource or an object instance. "Write attributes" operation has the following parameters.

TABLE 10

| Parameter | Required | Default Value | Notes |
|---|---|---|---|
| Object ID | Yes | — | Indicates the object. |
| Object Instance ID | Yes | — | Indicates the object instance to write attributes. |
| Resource ID | No | — | Indicates the resource to write attributes. |
| Minimum Period | No | 1 | When present, the minimum period indicates the minimum time in seconds the client should wait from the time when sending the last notification to the time when sending a new notification. In the absence of this parameter, the minimum period is defined by the default minimum period set in the LWM2M server object instance related to that server. |
| Maximum Period | No | — | When present, the maximum period indicated the maximum time in seconds the client should wait from the time when sending the last notification to the time sending the next notification (regardless if the value has changed). In the absence of this parameter, the maximum period is up to the server. |

TABLE 10-continued

| Parameter | Required | Default Value | Notes |
|---|---|---|---|
| | | | The maximum period must be greater than the minimum period parameter. In the absence of this parameter, the maximum period is defined by the default maximum period set in the LWM2M server object instance related to that server. |
| Greater than | No | — | When present, the client should notify its value when the value is above the number specified in parameter. |
| Less than | No | — | When present, the client should notify its value when the value is below the number specified in the parameter. |
| Step | No | — | When present, the client should notify its value when the value is changed more than the number specified in the parameter from the resource value when the client receives the observe operation.. |

The parameters "minimum period", "maximum period", "greater than", "less than" and "step" are only used in "Observe" operation. The parameters "maximum period" and/or "minimum period" are used to control how often "Notify" operation is transmitted by the M2M client for an observed object instance or resource. The parameters "greater than", "less than" and "step" are valid only when the resource ID is indicated. The parameters "greater than", "less than" and "step" need to be supported only when the resource type is number (e.g. integer, decimal).

Execute

"Execute" operation is used by the M2M server to initiate an operation and can be performed only for individual resources. The M2M client returns error when "Execute" operation is received for object instances or resource instances. "Execute" operation has the following parameters.

TABLE 11

| Parameter | Required | Default Value | Notes |
|---|---|---|---|
| Object ID | Yes | — | Indicates the object. |
| Object Instance ID | Yes | — | Indicates the object instance. |
| Resource ID | Yes | — | Indicates the resource to execute. |

Create

"Create" operation is used by the M2M server to generate an object instance in the M2M client. "Create" operation needs to target one of an object instance or object that is not instantiated.

An object instance generated in the M2M client by the M2M server should be of an object type supported by the M2M client and of an object instance which is notified by the M2M client to the M2M server using "Register" and "Update" operations of the device registration interface.

An object that supports at most one object instance should be allocated an object instance ID of 0 when the object instance is generated. "Create" operation has the following parameters.

TABLE 12

| Parameter | Required | Default Value | Notes |
|---|---|---|---|
| Object ID | Yes | — | Indicates the object. |
| Object Instance ID | No | — | Indicates the object instance to create. If this resource is not specified, the client assigns the ID of the object instance, which has not been used. |
| New Value | Yes | — | The new value included in the payload to create the object instance. |

Delete

"Delete" operation is used for the M2M server to delete an object instance in the M2M client. The object instance deleted from the M2M client by the M2M server should be an object instance that is notified to the M2M server by the M2M client using "Register" and "Update" operations of the device registration interface. "Delete" operation has the following parameters.

TABLE 13

| Parameter | Required | Default Value | Notes |
|---|---|---|---|
| Object ID | Yes | — | Indicates the object. |
| Object Instance ID | Yes | — | Indicates the object instance to delete. |

3. Operation for "Information Report" Interface

Observe

The M2M server can initiate observation request for changes in a specific resource in the M2M client, resources in an object instance or all object instances of an object. Related parameters for "Observe" operation are set by "Write Attributes" operations. "Observe" operation includes the following parameters.

TABLE 14

| Parameter | Required | Default Value | Notes |
|---|---|---|---|
| Object ID | Yes | — | Indicates the object. |
| Object Instance ID | No | — | Indicates the object instance to observe. If no object instance ID is indicated, then all the object instances of objects are observed and resource ID must not be specified. |

TABLE 14-continued

| Parameter | Required | Default Value | Notes |
|---|---|---|---|
| Resource ID | No | — | Indicates the resource to observe. If no resource ID is indicated, then the whole object instance is observed. |

Notify

A "notify" operation command is transmitted from an M2M client to an M2M server during valid observation for an object instance or a resource. This operation command includes a new value of the object instance or resource. The "notify" operation command needs to be transmitted when all conditions (i.e., a minimum period, a maximum period, "greater than", "less than", "step") set by the "write attribute" operation command for "observe" operation command are satisfied. The notify operation command includes the following parameter.

TABLE 15

| Parameter | Required | Default Value | Notes |
|---|---|---|---|
| Updated Value | Yes | — | The new value included in the payload about the Object Instance or Resource. |

Cancel Observe

"Cancel Observe" operation is transmitted from the M2M server to the M2M client to cancel observation for an object instance or a resource. "Cancel Observe" operation has the following parameters.

TABLE 16

| Parameter | Required | Default Value | Notes |
|---|---|---|---|
| Object ID | Yes | — | Indicates the object. |
| Object Instance ID | No | — | Indicates the object instance to stop observing. If no object instance ID is indicated, then object ID is indicated and resource ID must not be specified. |

TABLE 16-continued

| Parameter | Required | Default Value | Notes |
|---|---|---|---|
| Resource ID | No | — | Indicates the resource to stop observing. If no resource ID is indicated, then the whole object instance is indicated. |

Access Control Method

A description will be given of an access control method according to another embodiment of the present invention.

Access Right Acquisition

When the M2M client has an M2M server object instance, the M2M client has the rights to access corresponding resources without undergoing access control for the corresponding single M2M server, that is, without checking the access control object instance.

If the M2M client has two or more M2M server object instances, then the M2M client finds the ACL of a corresponding server with respect to an object instance to be accessed or an object instance including a resource to be accessed in access control object instances. If the ACL includes the access right corresponding to the corresponding M2M server ID, then the corresponding M2M server has the access right. If the ACL entry of the corresponding M2M server ID is not present, the M2M client checks whether the ACL includes access right allocated to a default server ID. When the default server ID is present, the corresponding M2M server has access right of the default server ID. When the access right corresponding to the M2M server ID and the access right of the default server ID are not present, the corresponding M2M server does not have the right to access the corresponding object instance or resource.

Access Control Object

An access control object is used to check whether an M2M server has the access right to perform operations. Each access control object instance includes an ACL for a specific object instance in the M2M client.

TABLE 17

| Resource Name | Resource ID | Supported Operations | Multiple Instances? | Mandatory? | Data Type | Range or Enumeration | Units | Descriptions |
|---|---|---|---|---|---|---|---|---|
| Object ID | 0 | R | Single | Mandatory | Integer | 1-65534 | — | The Object ID and the Object Instance ID are applied for LWM2M identifiers. |
| Object Instance ID | 1 | R | Single | Mandatory | Integer | 1-65535 | — | |
| ACL | 2 | R, W | Multiple | Optional | Integer | 8-bit | — | Resource instance ID must be the short server ID of a certain LWM2M server which has an access right. Resource instance ID 0 is for default short server ID. Setting each bit means the LWM2M server has the access right for that operation. The bit order is specified as below. $1^{st}$ lsb: Read, Observe, Discover, Write Attributes $2^{nd}$ lsb: Write $3^{rd}$ lsb: Execute |

TABLE 17-continued

| Resource Name | Resource ID | Supported Operations | Multiple Instances? | Mandatory? | Data Type | Range or Enumeration | Units | Descriptions |
| --- | --- | --- | --- | --- | --- | --- | --- | --- |
| | | | | | | | | $4^{th}$ lsb: Create
$5^{th}$ lsb: Delete
Other bits are reserved for future use |
| Access Control Owner | 3 | R, W | Single | Mandatory | Integer | 1-65365 | — | Short server ID of a certain LWM2M server. Only this LWM2M server can manage these resources of the object instance.
Value MAX_INTEGER = 0xFFFF is reserved for the access control object instances created during bootstrap procedure. |

Authentication Procedure

To pass an authentication procedure for an operation transmitted from an M2M server, the following needs to be satisfied. First, the M2M server needs to have the right (i.e. access right) to perform the operation transmitted for a corresponding resource (e.g. object instance or resource). Secondly, the corresponding resource needs to support the transmitted operation. An access right authentication procedure according to an embodiment of the present invention is performed through two steps, that is, in a hierarchical structure.

The M2M client notifies the M2M server that the transmitted operation is not performed due to a certain resource by transmitting an error message to the M2M server when the right to access the corresponding resource is not present and by transmitting information about the corresponding resource to the M2M server when the corresponding resource does not support the operation. The authentication procedure is differently performed for three levels, that is, a resource, an object instance and an object.

Operation for a Resource

If the M2M server accesses an individual resource, that is, the M2M server transmits an operation with respect to the individual resource to the M2M client, then the M2M client can acquire the access right of the M2M server for an object instance including the individual resource according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client verifies whether the individual resource supports the operation.

If the operation is not supported by the individual resource, then the M2M client needs to transmit an error code indicating "operation is not supported" to the M2M server.

When the operation is supported by the individual resource, the M2M client can perform the operation.

Operation for an Object Instance

When the M2M server accesses an object instance, that is, the M2M server transmits an operation with respect to the object instance to the M2M client, the M2M client can acquire the access right of the M2M server for the object instance according to the aforementioned access right acquisition method and check whether the access right is granted to perform the operation.

When the operation is not granted, the M2M client needs to transmit an error code indicating "grant of access right is rejected" to the M2M server.

When the operation is granted, the M2M client can perform the following processes based on the operation.

For "Write" operation, the M2M client can perform the operation with respect to the object instance only when all resources with respect to the transmitted operation support "Write" operation. If any resource (with respect to the transmitted operation) does not support "Write" operation, then the M2M client can notify the M2M server of resources that do not support the operation by transmitting an error code indicating "operation is not supported" to the M2M server.

For "Read" operation, the M2M client can retrieve all resources other than resources that do not support "Read" operation and transmit information about the retrieved resources to the M2M server.

For "Create" operation, the M2M client can perform the operation with respect to the object instance only when all resources with respect to the transmitted operation support "Write" operation and all mandatory resources are specified. If any resource (with respect to the transmitted operation) does not support "Write" operation, then the M2M client can transmit an error code indicating "operation is not supported" to the M2M server to notify the M2M server of resources that do not support the operation. When all mandatory resources are not specified, the M2M client can transmit error code "Bad Request" to the M2M server.

For "Delete", "Observe", "Write Attribute" or "Discover" operation, the M2M client needs to perform the operation. That is, the M2M client needs to perform "Delete", "Observe", "Write Attribute" or "Discover" operation without checking whether the operation with respect to the object instance is supported by all resources belonging to the object instance.

For an operation other than the aforementioned operations, the M2M client need not perform the operation and needs to transmit an error code of "operation is not supported" to the M2M server.

Whether the M2M server has the access right for the object instance is determined through the aforementioned access right acquisition method. Then, whether individual resources belonging to the object instance support the operation is checked. This process is performed depending upon the operation type.

Operation for an Object

Operations for objects are defined according to operation type.

When the M2M server transmits "Read" operation through an object, that is, the M2M server transmits "Read" operation with respect to the object to the M2M client, the M2M client can collect information on object instances for which the M2M server has the access right from among (lower) object instances belonging to the object and transmit the collected information to the M2M server. Whether the M2M server has the access right is determined according to the aforementioned access right acquisition method.

The information on the object instances for which the M2M server has the access right refers to information on resources searched by the M2M client except for resources that do not support "Read" operation.

When the M2M server transmits "Create" operation through an object, that is, the M2M server transmits "Create" operation with respect to the object to the M2M client, the M2M client can check whether the M2M server has the access right for the object according to the aforementioned access right acquisition method.

When the M2M server has the access right for the object, the M2M client can perform the operation only when all resources transmitted according to the operation support "Write" operation and all mandatory resources are specified. If any resource (with respect to the transmitted operation) does not support "Write" operation, the M2M client can notify the M2M server of resources that do not support the operation by transmitting error code of "operation is not supported" to the M2M server. If all mandatory resources are not specified, the M2M client can transmit error code "Bad Request" to the M2M server. That is, the M2M client notifies the M2M server that the operation according to the M2M server is incorrect.

In the case of "Discover" operation, the M2M client needs to perform the operation. That is, the M2M client does not check whether the M2M server has the access right for all lower object instances of the corresponding object and does not check whether all resources belonging to the object instances support "Discover" operation.

In the case of "Observe" or "Write Attributes" operation, the M2M client needs to perform the operation. That is, for "Observe" or "Write Attributes" operation, the M2M client does not check whether the M2M server has the access right for all lower object instances of the object and whether all resources belonging to the object instances support "Observe" or "Write Attributes" operation.

For an operation other than the aforementioned operations, the M2M client should not perform the operation and can transmit an error code of "operation is not supported" to the M2M server.

Whether the M2M server has the access right for the object is determined through the aforementioned access right acquisition method according to a specific operation for the object. Then, whether individual resources belonging to object instances of the object support the operation is checked. This process is performed depending upon the operation type. For a specific operation with respect to the object, whether the M2M server has the access right and whether the specific operation is supported may not be checked.

Hereinafter, a server security object (or object instance), a server object instance (or object instance), and a firmware update object (or object instance) will be briefly described.

An M2M server security object (or object instance) provides a key material of an M2M client suitable to access a specific M2M server or M2M bootstrap server. One object instance is recommended to address the M2M bootstrap server. Resources of the M2M server security object may be changed by the M2M bootstrap server or a smartcard via a bootstrap interface, but cannot be accessed by any other M2M servers.

TABLE 18

| Object | Object ID | Object URN | Multiple Instances? | Mandatory? |
|---|---|---|---|---|
| LWM2M Security | 0 | | Multiple | Mandatory |

TABLE 19

| Resource Name | Resource ID | Supported Operations | Multiple Instances? | Mandatory? | Type | Range or Enumeration | Units | Descriptions |
|---|---|---|---|---|---|---|---|---|
| LWM2M Server URI | 0 | | Single | Mandatory | String | 0-255 bytes | — | Uniquely identifies the LWM2M Server or LWM2M Bootstrap Server, and is in the form: "coaps://host:port", where host is an IP address or FQDN, and port is the UDP port of the Server. |
| BootstrapServer | 1 | | Single | Mandatory | Boolean | | — | Determines if the current instance concerns a LWM2M Bootstrap Server (true) or a standard LWM2M Server(false) |
| Security Mode | 2 | | Single | Mandatory | Integer | 0-3 | — | Determines which security mode of DTLS is used 0: Pre-Shared Key(PSK) mode 1: Raw Public Key(RPK) mode 2: Certificate mode 3: NoSec mode |
| Public Key or Identity | 3 | | Single | Mandatory | Opaque | | — | Stores the LWM2M Client's Certificate (Certificate mode), public key (RPK mode) or PSK Identity (PSK mode). |

TABLE 19-continued

| Resource Name | Resource ID | Supported Operations | Multiple Instances? | Mandatory? | Type | Range or Enumeration | Units | Descriptions |
|---|---|---|---|---|---|---|---|---|
| Server Public Key or Identity | 4 | | Single | Mandatory | Opaque | | — | Stores the LWM2M Server's or LWM2M Bootstrap Server's Certificate (Certificate mode), public key (RPK mode) or PSK Identity (PSK mode). |
| Secret Key | 5 | | Single | Mandatory | Opaque | | — | Stores the secret key or private key of the security mode. This resource MUST only be changed by a bootstrap server and MUST NOT be readable by any server. |
| Short Server ID | 6 | | Single | Optional | Integer | 1-65535 | — | This identifier uniquely identifies each LWM2M Server configured for the LWM2M Client. This resource MUST be set when the Bootstrap Server resource has false value. Default Short Server ID (i.e. 0) MUST NOT be used for identifying the LWM2M Server. |
| ClientHoldOffTime | 7 | | Single | Mandatory | Integer | | s | Relevant information for a Bootstrap Server only. The number of seconds to wait before initiating a Client Initiated Bootstrap once the LWM2M Client has determined it should initiate this bootstrap mode. |

Next, a description will be given of an M2M server object (or object instance). The M2M server object provides data related to an M2M server. The M2M bootstrap server does not have an object instance related thereto.

TABLE 20

| Object | Object ID | Object URN | Multiple Instances? | Mandatory? |
|---|---|---|---|---|
| LWM2M Server | 1 | | Multiple | Mandatory |

TABLE 21

| Resource Name | Resource ID | Supported Operations | Multiple Instances? | Mandatory? | Data Type | Range or Enumeration | Units | Descriptions |
|---|---|---|---|---|---|---|---|---|
| Short Server ID | 0 | R | Single | Mandatory | Integer | 1-65535 | — | Used as link to associate server object instance. |
| Lifetime | 1 | R, W | Single | Mandatory | Integer | | s | Specify the lifetime of the registration in seconds. |
| Default Minimum Period | 2 | R, W | Single | Optional | Integer | | s | The default value the Client should use for the Minimum Period of an Observation in the absence of this parameter being included in an Observation. If this Resource doesn't exist, the default value is 1. |
| Default Maximum Period | 3 | R, W | Single | Optional | Integer | | s | The default value the Client should use for the Maximum Period of an Observation in the absence of this parameter being included in an Observation.) |

TABLE 21-continued

| Resource Name | Resource ID | Supported Operations | Multiple Instances? | Mandatory? | Data Type | Range or Enumeration | Units | Descriptions |
|---|---|---|---|---|---|---|---|---|
| Disable | 4 | E | Single | Optional | | | | If this Resource is executed, this LWM2M Server Object is disabled for a certain period defined in the Disabled Timeout Resource. After receiving "execute" logical operation, Client MUST send response of the operation and perform de-registration process, and underlying network connection between the Client and Server MUST be disconnected to disable the LWM2M Server account. After the above process, the LWM2M Client MUST NOT send any message to the Server and ignore all the messages from the LWM2M Server for the period. |
| Disable Timeout | 5 | R, W | Single | Optional | Integer | | s | A period to disable the Server. After this period, the LWM2M Client MUST perform registration process to the Server. If this Resource is not set, a default timeout value is 86400 (1 day). |
| Notification Storing When Disabled or Offline | 6 | R, W | Single | Mandatory | Boolean | | | If true, the LWM2M Client stores "Notify" logical operations to the LWM2M Server while the LWM2M Server account is disabled or the Client is offline. After the LWM2M Server account is enabled or the Client is online, the LWM2M Client reports the stored "Notify" logical operations to the Server. If false, the LWM2M Client discards all the "Notify" logical operations or temporally disables the Observe function while the LWM2M Server is disabled or the Client is offline. The default value is true. The maximum number of storing Notification per the Server is up to the implementation. |
| Binding | 7 | R, W | Single | Mandatory | String | | | This Resource defines the transport binding configured for the Client. If the Client supports the binding specified in this Resource, the Client MUST use that for Current Binding and Mode. |
| Registration Update Trigger | 8 | E | Single | Mandatory | | | | If this Resource is executed the LWM2M Client SHALL perform an "Update" logical operation with this LWM2M Server using the CurrentTransport Binding and Mode. |

The present invention solves inefficiency caused when an account of an M2M server is deleted from an M2M client. When the account of the M2M server is deleted, the access right of the M2M server for a specific resource is also deleted. The access right to be deleted may cause difficulty in continuous management of the resource. In addition, when only the access right is deleted, the resource for which the access right is not present remains in the M2M client. In this case, the resource becomes an entity that no one can access. When an event is generated in the M2M client, a configuration for indicating the event may be set. Efficient resource management is performed when the M2M server account is deleted by releasing the configuration.

Access Right Owner

An access right owner is an entity capable of changing an ACL of a specific resource. The access right owner may have a specific access right (e.g. delegation access right) and may be separately stored in a specific field (e.g., access control owner field or self-permission field) to manage the corresponding ACL. As shown in Table 17, one or more access right owners may be present.

An M2M server account may be deleted by an M2M bootstrap server through the aforementioned bootstrap interface. Accordingly, the M2M server account is deleted through transmission and reception of a specific operation command between the M2M bootstrap server and a target M2M client. This will now be described.

The bootstrap interface is used to provide essential information to the M2M client to enable the M2M client to execute a "register" operation instruction with one or more M2M servers. There are four bootstrap modes supported by an M2M enabler.

Factory bootstrap: Bootstrap information is preset in an M2M client.

Bootstrap from a smartcard: The M2M client receives bootstrap information from a smartcard.

Client initiated bootstrap: The M2M client requests bootstrap to the M2M bootstrap server and the M2M bootstrap server adds/deletes/updates bootstrap information of the M2M client.

Server initiated bootstrap: The M2M bootstrap server adds/deletes/updates the bootstrap information of the M2M client.

The M2M client can support at least one bootstrap mode specified in the bootstrap interface. The M2M server can support all bootstrap modes specified in the bootstrap interface.

Bootstrap information refers to information that needs to be configured in an M2M client to access the M2M server or the M2M bootstrap server. The bootstrap information can be used prior to a bootstrap sequence or acquired as a result of the bootstrap sequence. The bootstrap information can be classified into two types, that is, bootstrap information for the M2M server and bootstrap information for the M2M bootstrap server.

The M2M client can have bootstrap information (e.g., information necessary for connection with the M2M server) for the M2M server after the bootstrap sequence. In addition, the M2M client can have bootstrap information (e.g., information necessary for connection with the M2M bootstrap server) for the M2M bootstrap server. The bootstrap information for the M2M server is used for the M2M client to register and connect with the M2M server.

The bootstrap information for the M2M server can include at least an M2M server security object instance in which a "bootstrap server" resource is set to "false". The bootstrap information for the M2M server can include other object instances.

The M2M client can be configured to use two or more M2M servers including a set of bootstrap information for the respective M2M servers. The bootstrap information for the M2M bootstrap server can be used by the M2M client to access M2M bootstrap information for obtaining the bootstrap information for the M2M server. The bootstrap information for the M2M bootstrap server may be an M2M server security object instance in which the "bootstrap server" resource is set to "true".

Bootstrap information can be classified as follows.

TABLE 22

| Bootstrap Information Type | Entity | Required |
|---|---|---|
| LWM2M Server Bootstrap Information | LWM2M Server Account | Yes (M2M client needs to have at least one M2M server account after bootstrap sequence.) |
| | Additional Object Instances (e.g., Access Control, Connectivity Object) | No |

TABLE 22-continued

| Bootstrap Information Type | Entity | Required |
|---|---|---|
| LWM2M Bootstrap Server Bootstrap Information | LWM2M Bootstrap Server Account | No |

The M2M client can accept bootstrap information transmitted through the bootstrap interface without an authentication procedure (access control).

The bootstrap interface selectively sets an M2M client such that the M2M client is successfully registered with the M2M server or connected with the M2M bootstrap server. A client bootstrap operation instruction is executed by transmitting a CoAP POST request with a query string parameter including an M2M client identifier through /bs path of the M2M bootstrap server.

When the M2M bootstrap server receives a request bootstrap operation instruction in client initiated bootstrap, the M2M bootstrap server can execute write and/or delete operation instructions. In server initiated bootstrap, the M2M bootstrap server can execute a write operation instruction. Write and/or delete operation instructions can target an object instance or resource. The write and/or delete operation instructions can be transmitted multiple times. Only in the bootstrap interface, a delete operation instruction can target "/" URI in order to delete all object instances except the M2M bootstrap server account from the M2M client for initialization of the M2M client before the M2M bootstrap server transmits write operation instructions to the M2M client. Distinguished from a write operation instruction in the device management and service enablement interface, the M2M client can write a payload of the operation instruction (i.e., a specific value intended to be written by the write operation instruction) irrespective of presence of a targeted object instance or resource. Operation instructions in the bootstrap interface are shown in the following. The write operation instruction can be replaced by another operation instruction (e.g., create).

TABLE 23

| Logical Operation | CoAP Method | URI | Success | Failure |
|---|---|---|---|---|
| Request Bootstrap | POST | /bs?ep={Endpoint Client Name} | 2.04 Changed | 4.00 Bad Request |
| Write | PUT | /{Object ID}/{Object Instance ID}/{Resource ID} | 2.04 Changed | 4.00 Bad Request |
| Delete | DELETE | /{Object ID}/{Object Instance ID}/{Resource ID} | 2.02 Deleted | 4.00 Bad Request |

Bootstrap Sequence

The M2M client must follow the bootstrap sequence (step) specified as below when attempting to bootstrap an M2M device.

If the M2M device has a smartcard, the M2M client tries to obtain bootstrap information from the smartcard.

If the M2M client is not configured using the bootstrap from smartcard mode, the M2M client tries to obtain the bootstrap information by using factory bootstrap mode.

If the M2M client has any M2M server object instances through the previous steps, the M2M client requests registration with an M2M server corresponding to the M2M server object instance.

When the M2M client fails to register with all M2M servers or does not have any M2M server object instance, the M2M client waits for server initiated bootstrap for a time ClientHoldOffTime specified by a specific resource and, when the server initiated bootstrap is not generated within the time, attempts to obtain bootstrap information through a client initiated bootstrap.

Client Initiated Bootstrap

An M2M server account may not be set (present) in the M2M client or an attempt to execute a "register" operation instruction with an M2M server may fail. In this case, the M2M client can use the client-initiated bootstrap mode in order to retrieve bootstrap information from the M2M bootstrap server. The client-initiated bootstrap mode can request an M2M security server object instance indicating (referring to) the M2M bootstrap server to be set (present) in the M2M client.

Figure 7:
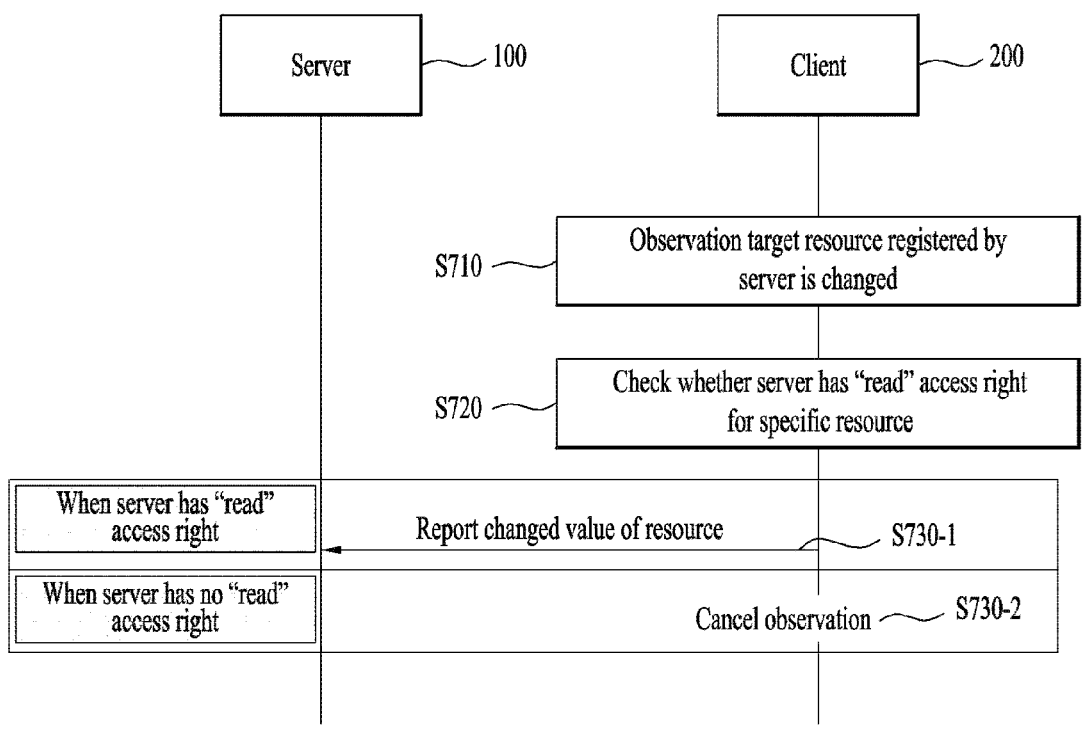
FIG. 7 illustrates a reporting (notification) operation in response to observation according to an embodiment of the present invention.

FIG. 7 illustrates a client-initiated bootstrap mode operation according to an embodiment of the present invention. The M2M client can transmit a "bootstrap request" operation instruction to a pre-provisioned M2M bootstrap server URI (S601). When the M2M client requests bootstrap, the M2M client can transmit "endpoint client name" (M2M client identifier) of the M2M client as a parameter to enable the M2M bootstrap server to provide appropriate bootstrap information for the M2M client.

The M2M bootstrap server can set (or configure) bootstrap information to the M2M client using "write" and/or "delete" operation instructions (S602).

The client-initiated bootstrap can be used to set some resources of the bootstrap information of the M2M client in order to update bootstrap information after the initial bootstrap. As an example, bootstrap information is optional and thus may be transmitted or not.

Server Initiated Bootstrap

In the case of server initiated bootstrap, the M2M client does not transmit a bootstrap request to the M2M bootstrap server and the M2M bootstrap server sets bootstrap information in the M2M client. Since the M2M client does not initiate "bootstrap request" operation instruction to the M2M bootstrap server, the M2M bootstrap server needs to know whether the M2M client or M2M device is ready to bootstrap before the M2M client is set by the M2M bootstrap server. The present invention does not provide a mechanism by which the M2M bootstrap server obtains such information. As an example, when the M2M device is connected to a network of a network provider, a scenario in which the network of the network provider informs the M2M bootstrap server of whether the M2M device is ready to bootstrap is possible.

When the M2M bootstrap server is notified that the M2M device is ready to receive the bootstrap information, the M2M bootstrap server can set the bootstrap information in the M2M client using "write" and/or "delete" operation instructions.

Figure 5:
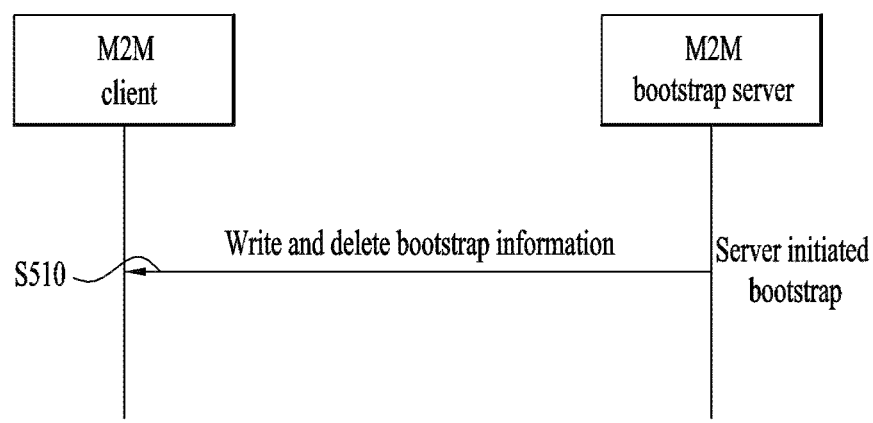
FIG. 5 illustrates a bootstrap operation according to an embodiment of the present invention.

FIG. 5 illustrates a server-initiated bootstrap mode operation according to an embodiment of the present invention. The M2M bootstrap server can set the bootstrap information in the M2M client using "write" and/or "delete" operation instructions (S701).

The server-initiated bootstrap can be used to set some resources of the bootstrap information of the M2M client in order to update bootstrap information after initial bootstrap. In this example, bootstrap information is optional and thus may be transmitted or not.

Bootstrap Information

Bootstrap information is information transmitted through an M2M bootstrap server and is necessary for an M2M client to be connected/communicate with an M2M server or the M2M bootstrap server. The bootstrap information can be transmitted through a bootstrap interface and can be used prior to a bootstrap sequence or obtained as a result of the bootstrap sequence.

The bootstrap information is classified into M2M server bootstrap information and M2M bootstrap server bootstrap information. The M2M server bootstrap information includes an M2M server account and optional object instances (e.g., an access control object instance and a network connectivity object instance), and the M2M bootstrap server bootstrap information includes an M2M bootstrap server account.

The M2M server account may store information necessary to connect to the M2M server, server related functions and information regarding server related functions. The M2M bootstrap server account stores information necessary to connect to the M2M bootstrap server.

The M2M client trusts and receives a bootstrap message that satisfies security requirements of the M2M server (e.g., data confidentiality, data integrity and source authentication) or information provided through the bootstrap interface.

Server Information

For communication between an M2M client and an M2M server, basic information and additional information (information transmitted through bootstrap) necessary for communication with the M2M server need to be provided through the M2M bootstrap server. Examples of such information include a server ID, a server address (e.g., IP, URI or the like), security credential, network bearer information, preferred network bearer information, resources that can be generated by the M2M server and the like. Specific M2M server (related) bootstrap information may refer to the server information.

Access Control Information

To access a specific resource of the M2M client, the M2M server needs to have rights to access the resource. Access control related information (i.e., an access control list (ACL) or resources including the ACL) can be changed through bootstrap. Corresponding information may be provided or not through bootstrapping.

Access Right Configuration for Server Account Deletion

When an account of an M2M server is deleted, the access right of the M2M server also needs to be deleted from the ACL of the corresponding M2M client. Here, when the M2M server is a unique access right owner for a specific resource (e.g. object), some problems are present as described above. Accordingly, when access rights of M2M servers other than the M2M server to be deleted are present in the ACL of the M2M client, the following procedure can be performed.

A) Blocking of Server Account Deletion

When the M2M server account is deleted, the corresponding deletion request may be blocked. To this end, the M2M client may send an error response along with a message representing that the corresponding M2M server is a unique access right owner upon reception of the deletion request. In this case, an M2M server (i.e., bootstrap M2M server) that requests deletion may change the access right owner to another M2M server or delete the corresponding ACL and then request the M2M client to delete the M2M server account again.

B) Access Right Owner Change

When the M2M server account is deleted, the M2M client may change the access right owner. Methods for changing the access right owner are as follows.

B-1) An M2M server having a highest access right in the ACL is set to a new access right owner. "Highest" access right means an access right that affects the corresponding resource or other resources related thereto in the widest range, from among access rights. For example, an access right for "write" is higher than an access right for "read".

Here, it is possible to respectively assign specific values to access rights for respective operation commands and to determine an M2M server having the largest sum of the specific values as a new access right owner. For example, when M2M server 1 has access rights for "write" and "read" and M2M server 2 has access rights for "write" and "execute", M2M server 1 becomes a new access right owner (values assigned to the commands—write: 4, read: 2, execute: 1).

In addition, the values assigned to access rights for the operation commands are exemplary and the same value (e.g. 1) may be assigned to access rights for all operation commands. This means that an M2M server having access rights for a largest number of operation commands can be designated as a new access right owner.

B-2) All M2M servers are designated as access right owners. Here, all M2M servers registered with the corresponding M2M client may be designated as access right owners or only M2M servers having access rights for the corresponding resource may be designated as access right owners. This method is useful when only default ACL entries for servers that are not specified in the ACL remain.

B-3) The first M2M server in an access right object instance is designated as an access right owner.

B-4) The access right owner remains vacant and an M2M server that accesses the corresponding resource first is designated as an access right owner.

C) Resource Deletion

When the account of the M2M server that is the access right owner is deleted, resources (e.g. a specific access control object instance) for which the M2M server is designated as the access right owner may be deleted. That is, even the resources are deleted by deleting the M2M server functioning as the owner of the resources. Here, a specific resource associated with the resources and an access right value of the specific resource are also deleted.

D) Designation of New Access Right Owner

The M2M server to be deleted may transmit a command requesting delegation of right for the resources for which the M2M server serves as the access right owner. That is, a specific M2M server (M2M server to which the access right is to be delegated) is set prior to transmission of the operation command for server account deletion and added as an access right owner for the resources for which the deleted M2M server was the access right owner.

Alternatively, the operation command for server account deletion may include information on an access right owner (i.e. the ID of another M2M server) after deletion of the server account such that the server corresponding to the access right owner included in the operation command for server account deletion can be designated as a new access right owner for the resources for which the deleted server was the access right owner, when the server account is deleted.

Resource Deletion

When the account of a specific M2M server is deleted, the specific M2M server is deleted from the ACL. When the M2M server to be deleted is an access right owner for a specific resource (e.g. object) and is a unique server present in the ACL, not only an access control object instance including the ACL but also a specific object instance associated with the access control object instance may be deleted.

Upon deletion of the specific M2M server account, the corresponding client may cancel a value set by the specific M2M server for previous reporting of a specific event.

Further, the server may be notified of the aforementioned operations such as access right configuration, resource deletion and reporting cancellation.

Access Control for Observation

An M2M server may want to receive a report on change of a specific resource or resource group (e.g. object instance) from the M2M client. For such reporting, the resource or resource group change may be checked through the aforementioned "observe" function. However, there is no limitation on registering the "observe" function, and thus the same effect as that of reading the corresponding resource (according to "read" operation command) may be acquired. Accordingly, an M2M server having no access right for the "read" operation command may read the value of the corresponding resource.

To prevent this, an access control method during reporting when the "observe" function is registered is described.

The access control method is applicable to other operation commands. That is, in the case of operation commands that create the same effect (or result), access control can be performed through one access right for the operation commands. The following table shows an exemplary access right for operation commands.

TABLE 24

| Operations/Command | Access right applied to access control mechanism |
|---|---|
| Read/Get | Read/Get |
| Observe/Notify | |

Observation Registration

Figure 6:
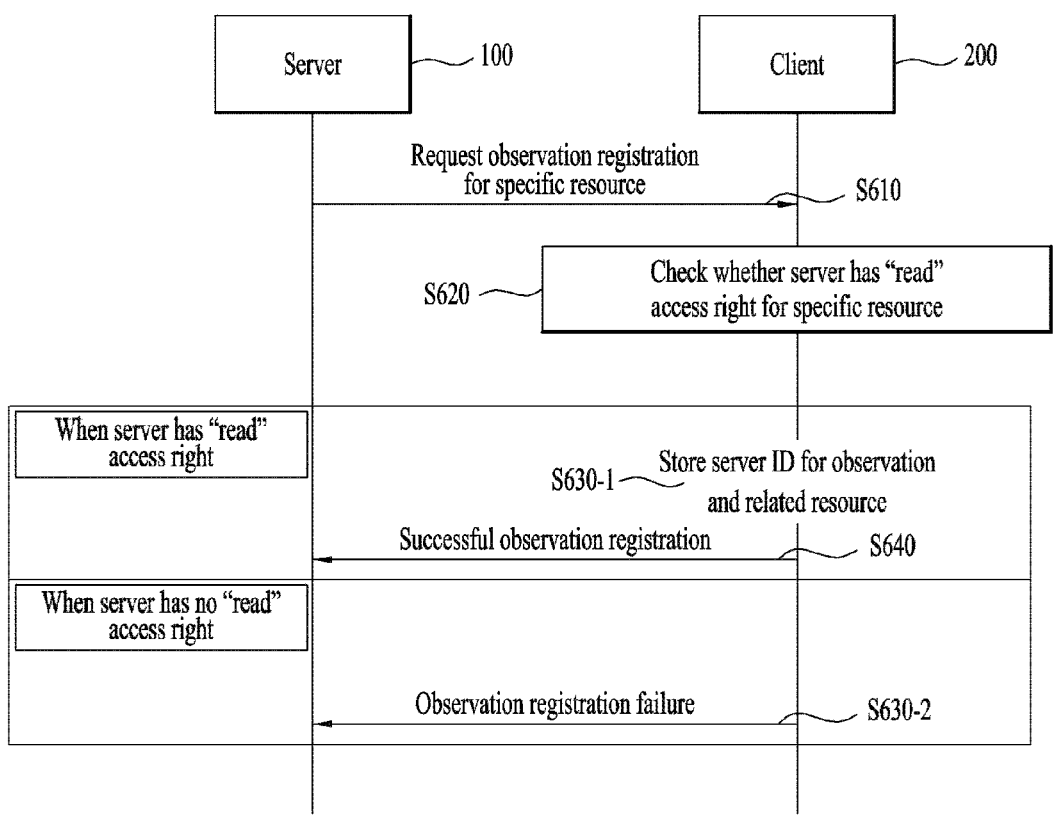
FIG. 6 illustrates an observation registration operation according to an embodiment of the present invention.

FIG. 6 is a flowchart illustrating observation registration according to an embodiment of the present invention.

A server 100 may request observation registration for a specific resource to a client 200 (S610). Then, the client may check whether the M2M server has a right (e.g. access right for "read" operation command) to read the resource for the resource (S620). When the M2M server has the right, the client may store the ID of the server and the corresponding resource (S630-1) and notify the server that observation registration has been successfully processed (S640). When the corresponding resource is changed, a reporting process is performed.

However, when the M2M server does not have the right, registration is not performed and the client may notify the server that observation registration has failed (S630-2).

Observation may be performed for resources for which authentication is not performed. For example, when "observe" operation command of the M2M server targets an object ID only, a plurality of object instances associated with the object indicated by the object ID may be present and the M2M server may not have "read" right for at least one object instance. In this case, two methods are applied.

1. Authorization is not performed and resources are unconditionally accepted during observation registration. In this case, only object instances, which have been successfully authorized (for which the corresponding M2M server has "read" right), from among the object instances may be reported. Alternatively, the authorized object instances are individually handled and, when one of the authorized object instances is changed, the object instance (i.e. individual object instance) can be reported when the M2M server has successfully authorized the changed object instance (i.e., when the M2M server has "read" right for the corresponding object instance).

2. All object instances may be authorized during observation registration and only authorized object instances may be observed. In this case, only when all object instances, which have been successfully authorized during registration, are successfully authorized (which is determined according to whether the M2M server has the access right for "read" operation command) during observation reporting, the object instances can be reported. Otherwise, it is possible to report only object instances which have been successfully authorized (which is determined according to whether the M2M server has the access right for "read" operation command) during reporting from among object instances which have been successfully authorized during registration. Alternatively, the object instances which have been successfully authorized during registration are individually handled and, when an authorized object instance is changed, the object instance can be reported when the M2M server has successfully authorized the changed object instance (which is determined according to whether the M2M server has the access right for "read" operation command).

Observation Reporting

FIG. 7 is a flowchart illustrating observation reporting according to an embodiment of the present invention.

The access right of the M2M server may be changed between when an "observe" function is registered and when the "observe" function is reported. Accordingly, the M2M client may check whether the M2M server has the "read" access right for the corresponding resource even when the "observe" function is reported (that is, when the observation reporting target resource is changed) (S720). When the M2M server has the "read" access right, the M2M client may report (notify) the corresponding resource (S730-1). When the M2M server does not have the "read" access right, the M2M client may cancel observation (and delete the observation function configuration) and notify the M2M server of observation cancellation (S730-2).

Observation reporting may be performed by the aforementioned "notify" operation command through an information reporting interface, which will now be described in more detail.

Figure 8:
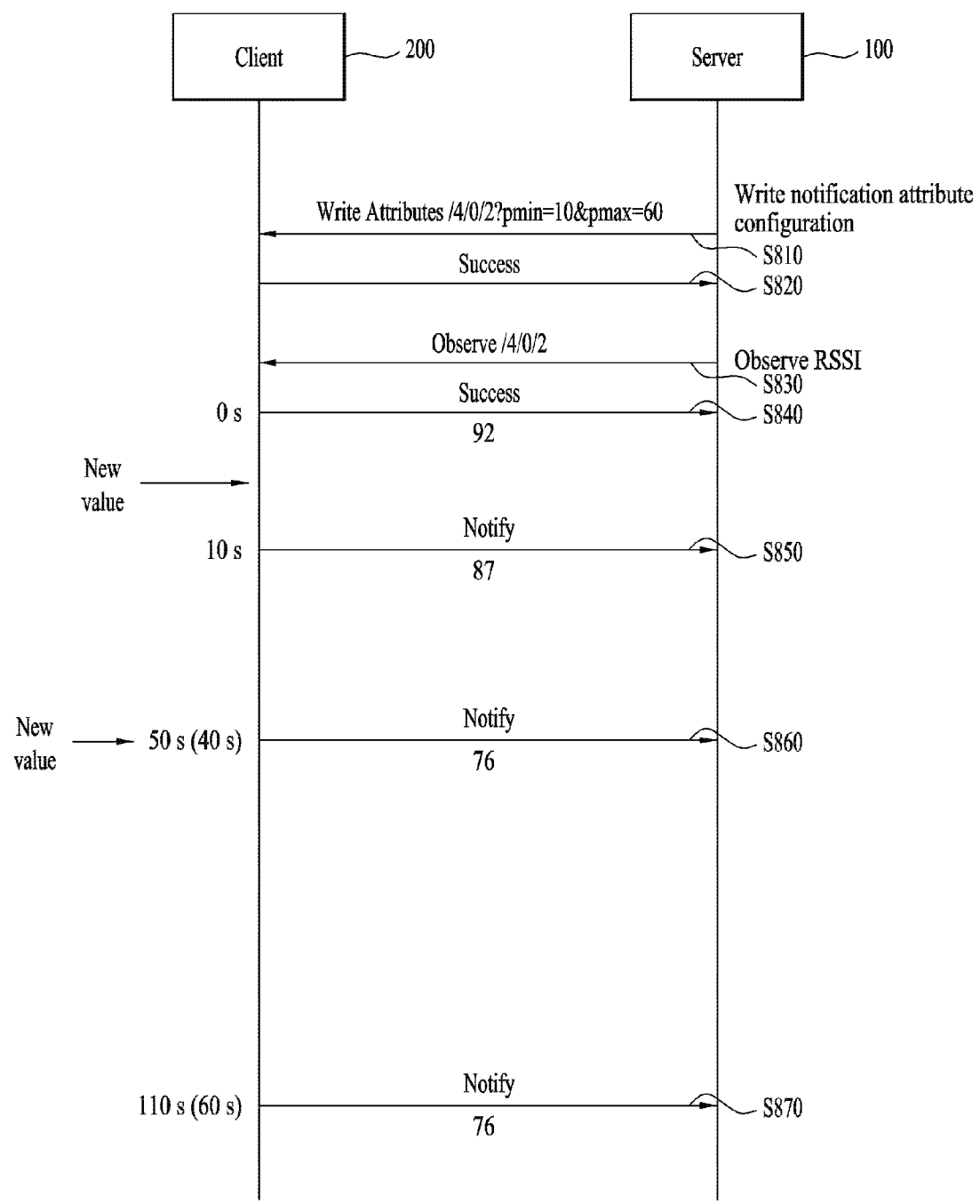
FIG. 8 illustrates an example of observation and registration and reporting in response thereto according to an embodiment of the present invention.

FIG. 8 is a flowchart illustrating observation and notification in response thereto according to an embodiment of the present invention.

The M2M server requests observation for a temperature that is updated in the M2M client at irregular periods.

More specifically, the M2M server may request observation, for which a minimum period of 10 seconds and a maximum period of 60 seconds are set, for a resource associated with the temperature. This can be performed by "write attribute" operation command through "device management and service enablement interface" and "observe" operation command through "information reporting interface", as described above. Specifically, parameters (i.e. the minimum period and the maximum period) for a detailed set value of "notification" are set through "write attribute" operation command (S810) and the M2M client may respond thereto by sending a result (e.g. success) of the "write attribute" operation command (S820).

Then, the M2M server may request observation for the temperature associated resource to the M2M client (S830). The M2M client may respond to the request by sending a result (e.g., success) of the "observe" operation command (S840).

The M2M client will wait at least 10 seconds before sending "notification" to the M2M server even if the value of the resource has changed and may notify the M2M server of the value of the resource after the lapse of 10 seconds (S850).

When the value of the resource is changed after 40 seconds from the notification, the M2M client may notify the M2M server of the value of the resource (S860).

In addition, the M2M client needs to send the "notification" within 60 seconds even if the value of the resource has not changed (S870).

That is, notification timing is restricted by notification configuration (i.e. the minimum period and the maximum period). More specifically, notification must be sent at least once between the minimum period and the maximum period.

According to the aforementioned configuration, "notification" can be transmitted at an arbitrary time between 10 to 60 seconds upon change of the resource.

In addition, the observation may be cancelled. This can be performed by the aforementioned "observation cancel" operation command.

The "observation cancel" operation command is transmitted from the M2M server to the M2M client in order to end the observation relationship for objects instances or resources. The "observation cancel" operation command includes no parameter in an M2M layer. The "observation cancel" operation command must be used as a response to the "notify" operation command.

For observation cancellation, two methods may be used for the M2M server.

Transmission of "Observation Cancel" Operation Command

According to restrictions of this option, if the M2M server receives the "notify" operation command in which the M2M server is no longer interested, the M2M server can send "observation cancel" in response to the "notify" operation command.

Transmission of "Write Attribute" Operation Command Including Cancellation Parameter This operation has no restriction. If the M2M server transmits the "write attribute" operation command including the cancellation parameter to a specific URI within the M2M client, the M2M client can cancel observation for the specific URI.

Connection Mode Configuration

The M2M server may configure a connection mode. Connection mode configuration is for the purpose of reducing battery power consumption by increasing a sleep period of the device and can be used to maintain more reliable communication.

Always Online

The M2M server may keep the M2M client online through configuration. In this state, the M2M server can send a command (management or operation command) to the M2M client any time as necessary.

Event Driven Online

The M2M server may cause the M2M client to enter an online state through an event according to configuration. In this case, the M2M client can transmit a message representing that the M2M client is online upon generation of the event and wait for a command (management or operation command) of the M2M server for a specific time or wait a specific time from the last command when continuously transmitting a specific command to the M2M server while waiting for a command.

Periodic Online

The M2M server may enable the M2M client to periodically maintain the online state through configuration. The M2M client can send a message indicating the online state to the M2M server and wait for a command (management or operation command) of the M2M server for a specific time or wait a specific time from the last command when continuously transmitting a specific command to the M2M server while waiting for a command from the M2M server, at an interval set by the M2M server or a preconfigured interval. The interval is not related to an event generated in the M2M client and the M2M client can transmit reporting information collected offline to the M2M server at the interval.

Alternatively, the M2M server may determine a time when the M2M client goes online. For example, when 3:05 pm everyday is set, the M2M client transmits an update message at the corresponding time to enable the M2M server to execute a specific operation command. A timeout may be present in the set time. When the timeout is present, the M2M client maintains the online state with the M2M server until the corresponding time.

Mode Change Considerations

In the case of event driven online or periodic online, the M2M server cannot perform reliable communication with the M2M client. When continuous communication is needed (for firmware update and the like, for example), the M2M server may transmit a command for changing to the always online mode when the M2M client is temporarily in the online state. When continuous communication is ended, the M2M server may change the always online mode to the previous mode or other modes. Further, the M2M server may enable the always online mode to be maintained.

Event Level Considerations

Events may have levels. Event levels can be classified into two levels according to whether change from the sleep mode (or disconnected state) to the online mode is needed.

In the case of an event for which change to the online mode is necessary, the M2M client immediately enters the online state at the corresponding time to perform reporting. In the case of an event for which change to the online mode is not necessary, the M2M client can report the corresponding event when the M2M client enters the online state for other reasons.

Figure 9:
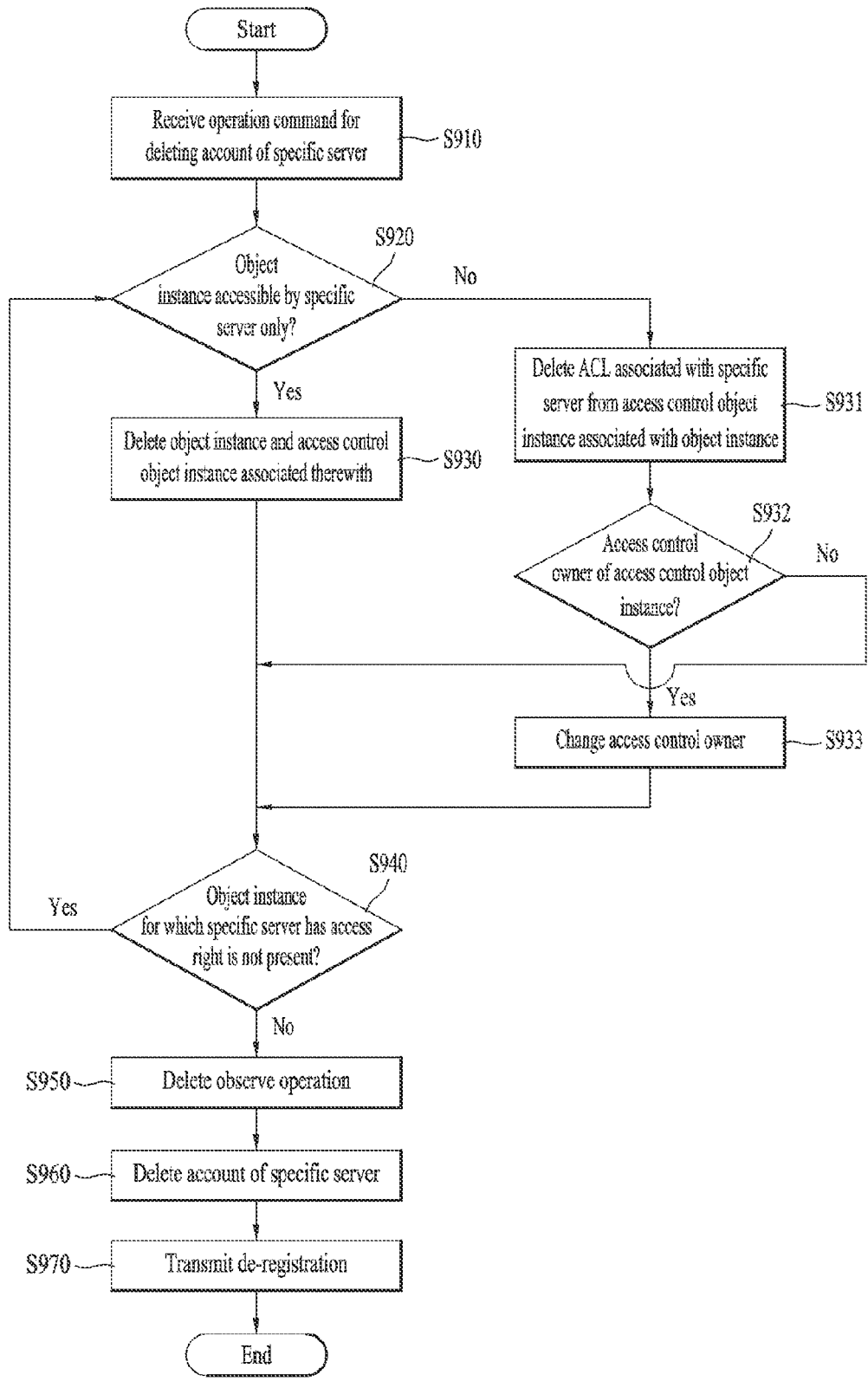
FIG. 9 illustrates an operation of changing an access right owner according to an embodiment of the present invention.

FIG. 9 is a flowchart illustrating an operation according to an embodiment of the present invention.

A terminal may receive an operation command (e.g. "delete" operation command) for deleting an account of a specific server from a first server (S910). In the present invention, a server account is not limited to names of object instances and refers to a set of information on a specific server. More specifically, the server account includes the aforementioned server object (instance) and security object (instance). In addition, the server account means that "bootstrap server" resource in the security object (instance) is set to "false".

The operation command for deletion may be received through a bootstrap interface and thus the first server may be a bootstrap server.

The terminal may determine whether object instances associated with the specific server include an object instance accessible by the specific server only (S920).

When the object instances associated with the specific server include an object instance accessible by the specific server only, the terminal can delete the object instance and an access object instance associated therewith (S930). That is, the terminal can delete access right information of the specific server. Since the corresponding object instance is not associated with other servers, the object instance and the access object instance associated therewith cannot be accessed by any server when the account of the specific server is deleted. Accordingly, it is desirable to delete the object instance and the access object instance associated therewith.

When the object instances associated with the specific server include object instances accessible by a plurality of servers including the specific server, the terminal can delete a resource associated with the specific server, for example, ACL entry of the aforementioned access control object instance, in access object instances associated with the corresponding object instances (S931). This is because it is preferable to delete only the resource associated with the specific server since other servers can access the object instances, distinguished from S930.

In addition, the terminal can determine whether the specific server is an access control owner for the access control object instance (S932)

When the specific server is the access control owner for the access control object instance, the terminal can set a new access control owner for the access control object instance using the following method (S933). This is for the purpose of solving/preventing inconvenient resource management and resource utilization restrictions due to absence of the manager (i.e., access control owner) for the access control object instance.

A specific value is assigned per access right designated (or permitted) by the access control object instance. For example, the access right for the "write" operation command can be assigned "1" and the access right for the "read" operation command can be assigned "2". The terminal can calculate the sum of the values for each server and set a server having the largest sum as a new access control owner. When two or more servers have the same sum, the terminal can select one of the servers and set the selected server as a new access control owner.

When the specific server is not the access control owner for the access control object instance, S933 is skipped.

Then, the terminal may check whether the specific server has access rights for all object instances of the terminal (S940). That is, the terminal can check operation commands for which the specific server has access rights. If an object instance for which the specific server has an access right for an operation command is present, the terminal may return to S920 to repeat the operation of the present invention. That is, the operation of the present invention can be repeated until resources, in which operation commands for which the specific server has access rights are specified, are not present.

Upon determining that no operation command for which the specific server has an access right is present, the terminal can cancel observation operation configuration set by the specific server (S950). That is, the terminal can delete configuration information stored through the "observe" operation command transmitted from the specific server.

Then, the terminal can completely delete the account of the specific server (S960). That is, although the specific server account deletion request is received in S910, the account of the specific server is actually deleted in step S960. When the deletion command is executed first, information, such as a short server ID, in the server account is deleted and thus an ACL entry, which needs to be deleted on the basis of the short server ID, cannot be found since the short server ID has been deleted. Accordingly, the server account is deleted lastly. Furthermore, the terminal may transmit a "de-register" operation command for the specific server (S970).

The embodiment described with reference to FIG. 9 may be related to the description with reference to FIGS. 1 to 8, and thus a person skilled in the art may delimit the embodiment with respect to FIG. 9 with reference to the description with respect to FIGS. 1 to 8.

The terminal may select only some steps shown in FIG. 9 and execute the selected steps.

Figure 10:
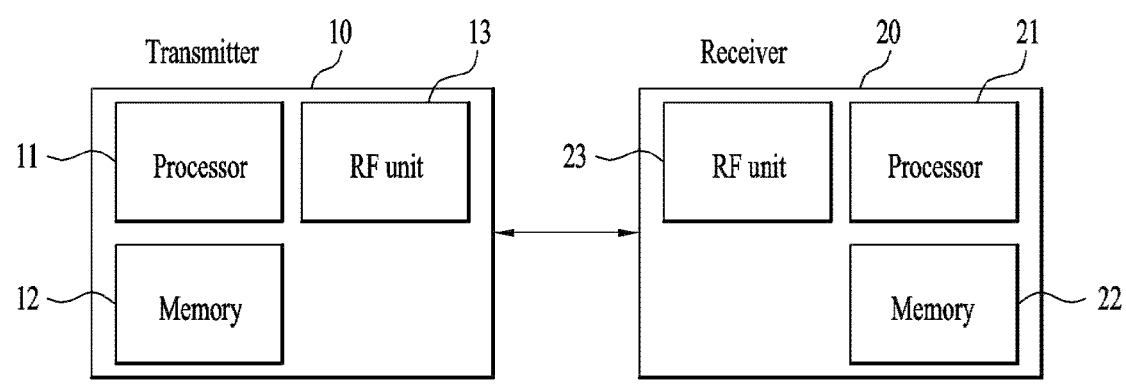
FIG. 10 is a block diagram of an apparatus for implementing embodiments of the present invention.

FIG. 10 is a block diagram of an apparatus for implementing the embodiments of the present invention. A transmitter 10 and a receiver 20 respectively include radio frequency (RF) units 13 and 23 for transmitting and receiving RF signals carrying information and/or data, signals, messages, etc., memories 12 and 22 storing information related to communication in a wireless communication system, and processors 11 and 21 which are operatively connected to the RF units 13 and 23 and the memories 12 and 22 and control the RF units 13 and 23 and the memories 12 and 22 such that the transmitter and the receiver perform at least one of the embodiments of the present invention.

The memories 12 and 22 can store programs for processing and control of the processors 11 and 21 and temporarily store input/output information. The memories 12 and 22 can function as buffers.

The processors 11 and 21 control overall operations of modules in the transmitter and the receiver. Particularly, the processors 11 and 12 can execute various control functions for implementing the present invention. The processor may be referred to as a controller, microcontroller, microprocessor, microcomputer, etc. The processors 11 and 21 may be achieved by various means, for example, hardware, firmware, software, or a combination thereof. When the present invention is implemented using hardware, ASICs (application specific integrated circuits), DSPs (digital signal processors), DSDPs (digital signal processing devices), PLDs (programmable logic devices), FPGAs (field programmable gate arrays), etc. configured to implement the present invention can be included in the processors 11 and 12. When the present invention is implemented using firmware or software, firmware or software can be configured to include a module, a procedure, a function, etc. for executing functions or operations of the present invention. The firmware or software configured to implement the present invention can be included in the processors 11 and 21 or stored in the memories 12 and 22 and executed by the processors 11 and 21.

In the embodiments of the present invention, an M2M server, an M2M client, a server or a terminal can operate as an apparatus in which the M2M server, M2M client, server or terminal is mounted or installed, that is, the transmitter 10 or the receiver 20.

The M2M server, M2M client, server or terminal as the transmitter or receiver can be configured such that the aforementioned embodiments of the present invention are independently applied or two or more thereof are simultaneously applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a terminal, a base station, a server or other apparatus of a wireless mobile communication system.

The invention claimed is:

1. A method for processing, by a terminal, a specific object instance associated with a server due to deletion of an account of the server in a wireless communication system, the method comprising:
    receiving, by the terminal from a first server, an operation command for deleting an account of a specific server;
    deleting, by the terminal, the specific object instance and an access control object instance associated with the specific object instance when the specific object instance is an object instance accessible by the specific server only;
    deleting, by the terminal, access right information of the specific server from the access control object instance associated with the specific object instance when the specific object instance is an object instance accessible by a plurality of servers including the specific server;
    changing, by the terminal, a server having the highest sum of values assigned to each access right, from among the plurality of servers except for the specific server, to an access control owner of the access control object instance, when the specific server is a unique access control owner of the access control object instance; and
    transmitting, by the terminal to a second server, notification for change of the access control owner when the access control owner is changed, if an "observe" operation is set for the access control owner of the access control object instance by the second server,
    wherein the account of the specific server includes a short server ID of the specific server and a security key for communication with the specific server.

2. The method according to claim 1, wherein the changing comprises selecting one of two or more servers when there are the two or more servers having the highest sum of values, and changing the selected server to the access control owner.

3. The method according to claim 1, wherein the operation command for deleting the account of the specific server is received through a bootstrap interface.

4. The method according to claim 1, wherein the first server is a bootstrap server.

5. The method according to claim 1, further comprising:
    deleting, by the terminal, configuration information related to an "observe" operation command stored through the "observe" operation command transmitted from the specific server.

6. A terminal configured to process a specific object instance associated with a server due to deletion of an account of the server in a wireless communication system, comprising:
    a radio frequency (RF) unit; and
    a processor that:
        controls the RF unit to receive, from a first server, an operation command for deleting an account of a specific server,
        deletes the specific object instance and an access control object instance associated with the specific object instance when the specific object instance is an object instance accessible by the specific server only, deletes access right information of the specific server from the access control object instance associated with the specific object instance when the specific object instance is an object instance accessible by a plurality of servers including the specific server, and changes a server having the highest sum of values assigned to each access right, from among the plurality of servers except for the specific server, to an access control owner of the access control object instance, when the specific server is a unique access control owner of the access control object instance, wherein, if an "observe" operation is set for the access control owner of the access control object instance by a second server, the processor transmits, to the second server, notification for change of the access control owner when the access control owner is changed, and wherein the account of the specific server includes a short server ID of the specific server and a security key for communication with the specific server.

7. The terminal according to claim 6, wherein the processor selects one of two or more servers when there are the two or more servers having the highest sum of values and to change the selected server to the access control owner.

8. The terminal according to claim 6, wherein the operation command for deleting the account of the specific server is received through a bootstrap interface.

9. The terminal according to claim 6, wherein the first server is a bootstrap server.

10. The terminal according to claim 6, wherein the processor deletes configuration information related to an "observe" operation command stored through the "observe" operation command transmitted from the specific server.

* * * * *